(12) United States Patent
Maruyama

(10) Patent No.: US 11,460,632 B2
(45) Date of Patent: Oct. 4, 2022

(54) OPTICAL FIBER

(71) Applicant: Fujikura Ltd., Tokyo (JP)

(72) Inventor: Ryo Maruyama, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 17/296,174

(22) PCT Filed: Nov. 6, 2020

(86) PCT No.: PCT/JP2020/041537
§ 371 (c)(1),
(2) Date: May 21, 2021

(87) PCT Pub. No.: WO2021/090912
PCT Pub. Date: May 14, 2021

(65) Prior Publication Data
US 2022/0011505 A1 Jan. 13, 2022

(30) Foreign Application Priority Data
Nov. 8, 2019 (JP) .............................. JP2019-203555

(51) Int. Cl.
*G02B 6/02* (2006.01)
*G02B 6/028* (2006.01)
(Continued)

(52) U.S. Cl.
CPC ..... *G02B 6/02395* (2013.01); *G02B 6/02009* (2013.01); *G02B 6/0288* (2013.01);
(Continued)

(58) Field of Classification Search
CPC ............ G02B 6/02395; G02B 6/02009; G02B 6/02238; G02B 6/0288; G02B 6/03694; G02B 6/4403
(Continued)

(56) References Cited

U.S. PATENT DOCUMENTS 3,301,001 A1 10/2012 Nakanishi et al.
2002/0102082 A1* 8/2002 Sarchi ................ G02B 6/02271
385/123

(Continued)

FOREIGN PATENT DOCUMENTS

JP 2012508395 A 4/2012
JP 2013127608 A 6/2013
(Continued)

OTHER PUBLICATIONS

C. Unger, et al, "Characterization of the bending sensitivity of fibers by the MAC-value," Optics Communications, vol. 107, No. 5-6, pp. 361-364, 1994 (4 pages).
(Continued)

*Primary Examiner* — Jerry M Blevins
(74) *Attorney, Agent, or Firm* — Osha Bergman Watanabe & Burton LLP

(57) ABSTRACT

An optical fiber includes a glass portion, a primary coating layer, and a secondary coating layer. In the optical fiber, a value of microbend loss characteristic factor $F_{\mu BL\_GO}$ is 2.6 ($[GPa^{-1} \cdot \mu m^{-10.5} \cdot dB/turn] \cdot 10^{-27}$) or less, when represented by $$F_{\mu BL\_GO} = F_{\mu BL\_G} \times F_{\mu BL\_O}$$

by using geometry microbend loss characteristic $F_{\mu BL\_G}$ and optical microbend loss characteristic $F_{\mu BL\_O}$.

16 Claims, 5 Drawing Sheets

(51) Int. Cl.
*G02B 6/036* (2006.01)
*G02B 6/44* (2006.01)

(52) U.S. Cl.
CPC ..... *G02B 6/02238* (2013.01); *G02B 6/03694* (2013.01); *G02B 6/4403* (2013.01)

(58) Field of Classification Search
USPC ........................................................ 385/128
See application file for complete search history.

(56) References Cited

U.S. PATENT DOCUMENTS

| | | | | |
|---|---|---|---|---|
| 2003/0044142 | A1* | 3/2003 | Park | G02B 6/4494 |
| | | | | 385/114 |
| 2003/0202763 | A1* | 10/2003 | Starodubov | C03C 25/1062 |
| | | | | 385/128 |
| 2008/0152288 | A1* | 6/2008 | Flammer | G02B 6/0365 |
| | | | | 385/124 |
| 2010/0290781 | A1* | 11/2010 | Overton | G02B 6/02395 |
| | | | | 398/43 |
| 2011/0054862 | A1* | 3/2011 | Pimpinella | G02B 6/02214 |
| | | | | 703/2 |
| 2011/0188822 | A1* | 8/2011 | Konstadinidis | C03C 25/1065 |
| | | | | 385/123 |
| 2011/0229101 | A1 | 9/2011 | de Montmorillon et al. | |
| 2013/0077925 | A1* | 3/2013 | Hirano | G02B 6/028 |
| | | | | 385/123 |
| 2014/0056596 | A1* | 2/2014 | Nakanishi | C03B 37/027 |
| | | | | 398/141 |
| 2016/0011365 | A1* | 1/2016 | Berkey | C03B 37/0183 |
| | | | | 385/127 |
| 2017/0285260 | A1* | 10/2017 | Bookbinder | G02B 6/0365 |
| 2018/0039020 | A1* | 2/2018 | Long | G02B 6/02266 |
| 2019/0047238 | A1* | 2/2019 | Okada | G02B 6/4457 |
| 2019/0331848 | A1* | 10/2019 | Bennett | G02B 6/02395 |
| 2019/0331849 | A1 | 10/2019 | Bennett et al. | |
| 2019/0331850 | A1 | 10/2019 | Bennett et al. | |
| 2020/0003589 | A1* | 1/2020 | Bickham | G02B 6/0288 |

FOREIGN PATENT DOCUMENTS

| | | |
|---|---|---|
| JP | 2016522428 A | 7/2016 |
| JP | 2017062486 A | 3/2017 |
| JP | 2017526601 A | 9/2017 |
| JP | 2018146968 A | 9/2018 |
| JP | 2018533079 A | 11/2018 |
| JP | 2019511751 A | 4/2019 |
| JP | 2019158941 A | 9/2019 |
| WO | 2005010589 A1 | 2/2005 |
| WO | 2018025896 A1 | 2/2018 |
| WO | 2021/039914 A1 | 3/2021 |

OTHER PUBLICATIONS

Baldauf, John, et al, "Relationship of Mechanical Characteristics of Dual Coated Single Mode Optical Fibers and Microbending Loss," IEICE Trans. Commun., vol. E76-B, No. 4, 1993 (6 pages).

K. Kobayashi, et al, "Study of Microbending Loss in Thin Coated Fibers and Fiber Ribbons," IWCS, pp. 386-392, 1993 (8 pages).

Saitoh, Kunimasa, and Masanori Koshiba, "Full-Vectoral Imaginary-Distance Beam Propagation Method Based on a Finite Element Scheme: Application to Photonic Crystal Fibers," IEEE Journal of Quantum Electronics, vol. 38, pp. 927-933, 2002 (7 pages).

International Search Report issued in corresponding International Application No. PCT/JP2020/041537, dated Jan. 12, 2021, with translation (9 pages).

Written Opinion issued in corresponding International Application No. PCT/JP2020/041537, dated Jan. 12, 2021 (5 pages).

Pierre Sillard, et al., "Micro-Bend Losses of Trench-Assisted Single-Mode Fibers," European Conference on Optical Communication, 2010 (3 pages).

Olshansky, "Mode Coupling Effects in Graded-Index Optical Fibers," Applied Optics, vol. 14, No. 4, pp. 935-945, Apr. 1975 (11 pages).

\* cited by examiner

OPTICAL FIBER

TECHNICAL FIELD

The present invention relates to an optical fiber, specifically, to an optical fiber that can be used for an optical fiber cable.

BACKGROUND

In recent years, the traffic of communication infrastructures constructed by optical fiber cables and the like has been increasing due to the maturity of Fiber To The Home (FTTH) services, the spread of mobile terminals, the expansion of cloud service usage, the increase in video traffic, and the like. Therefore, it is demanded to construct communication infrastructures more economically and efficiently than before. Under such background, there is a demand to increase the number of mounting cores and mounting density of optical fibers mounted in optical fiber cables.

As a means for increasing the number of mounting cores and mounting density of the optical fibers, it is conceivable to reduce the diameter of the optical fibers. However, in this case, the optical fibers are easily affected by the lateral pressure, and the microbend loss, which is the optical loss caused by the shaft of the optical fibers being slightly bent, can be large. Patent Literature 1 below describes that the elastic modulus and the glass transition point of an optical fiber coating are adjusted to reduce the coating thickness of the optical fiber so that the microbend loss can be suppressed even when the diameter of the optical fiber is reduced.

PATENT LITERATURE

[Patent Literature 1] JP 2012-508395 A

However, the aforementioned microbend loss tends to be affected by parameters related to the geometry of the optical fiber such as the coating thickness of the optical fiber, the outside diameter of the glass forming the core and the clad, the Young's modulus of the aforementioned glass, and the Young's modulus of the coating, and parameters related to the optical characteristics of the optical fiber such as the mode field diameter of light propagating through the optical fiber, the cutoff wavelength, and the macrobend loss. In Patent Literature 1 described above, the coating thickness is taken into consideration as the aforementioned parameter in terms of suppressing microbend loss, but the parameters other than the coating thickness are not taken into consideration. Therefore, there is a demand for an optical fiber capable of suppressing microbend loss that takes into consideration various parameters that affect microbend loss.

SUMMARY

One or more embodiments of the invention provide an optical fiber capable of suppressing microbend loss.

An optical fiber according to one or more embodiments includes a glass portion including a core and a clad surrounding the core, a primary coating layer covering the clad, and a secondary coating layer covering the primary coating layer, in which a value of microbend loss characteristic factor $F_{\mu BL\_GO}$ [(GPa$^{-1}$·µm$^{-10.5}$·dB/turn]·10$^{-27}$) represented by $$F_{\mu BL\_GO} = F_{\mu BL\_G} \times F_{\mu BL\_O}$$

by using geometry microbend loss characteristic $F_{\mu BL\_G}$ (GPa$^{-1}$·µm$^{-10.5}$·10$^{-27}$) of the optical fiber represented by $$F_{\mu BL\_G} = \frac{K_s^2}{H_f^2 \times D_0^{0.375} \times H_0^{0.625}}$$

$$K_s = \frac{E_p d_f}{t_p},\ H_f = \frac{\pi}{4} E_g \left(\frac{d_f}{2}\right)^4,\ D_0 = E_p + \left(\frac{t_s}{R_s}\right)^3 E_s,\ H_0 = \frac{\pi}{4} E_s (R_s^4 - R_p^4)$$

when a spring coefficient of the primary coating layer is $\kappa_s$ (MPa), a bending rigidity of the glass portion is $H_f$ (MPa·µm$^4$), a deformation resistance of the secondary coating layer is $D_0$ (MPa), a bending rigidity of the secondary coating layer is $H_0$ (MPa·µm$^4$), a Young's modulus of the glass portion is $E_g$ (GPa), a Young's modulus of the primary coating layer is $E_p$ (MPa), a Young's modulus of the secondary coating layer is $E_s$ (MPa), an outside diameter of the glass portion is $d_f$ (µm), a radius of an outer peripheral surface of the primary coating layer is $R_p$ (µm), a radius of an outer peripheral surface of the secondary coating layer is $R_s$ (µm), a thickness of the primary coating layer is $t_p$ (µm), and a thickness of the secondary coating layer is $t_s$ (µm), and optical microbend loss characteristic $F_{\mu BL\_O}$ (dB/turn) of the optical fiber represented by $$F_{\mu BL\_O} = \frac{2w}{\lambda_{cc}} \times \alpha_{BL}$$

when a mode field diameter of light having a wavelength of 1310 nm propagating through the optical fiber is 2w (µm), a cutoff wavelength of the optical fiber is $\lambda_{cc}$ (µm), and a macrobend loss of the optical fiber at a wavelength of 1625 nm and a radius of 10 mm is $\alpha_{BL}$ (dB/turn), is 2.6 or less.

The microbend loss of optical fiber is, as described in Non-Patent Literature 1 (J. Baldauf, et al., "Relationship of Mechanical Characteristics of Dual Coated Single Mode Optical Fibers and Microbending Loss, "IEICE Trans. Commun., vol. E76-B, No. 4, 1993) and Non-Patent Literature 2 (C. Unger, et al., "Characterization of the bending sensitivity of fibers by the MAC-value, "Optics Communications vol. 107, no. 5-6, pp. 361-364, 1994), tends to be affected by both the geometry and the optical characteristics of the optical fiber.

Here, the geometry of the optical fiber is a parameter related to the structure of the optical fiber, and, in one or more embodiments of the invention, the spring coefficient $\kappa_s$ of a primary coating layer of the optical fiber, the bending rigidity $H_f$ of a glass portion, the deformation resistance $D_0$ of a secondary coating layer, the bending rigidity $H_0$ of the secondary coating layer, the Young's modulus $E_g$ of the glass portion, the Young's modulus $E_p$ of the primary coating layer, the Young's modulus $E_s$ of the secondary coating layer, the outside diameter $d_f$ of the glass portion (diameter of the glass portion), the radius $R_p$ of the primary coating layer, the radius $R_s$ of the secondary coating layer, the thickness $t_p$ of the primary coating layer, and the thickness $t_s$ of the secondary coating layer.

Furthermore, the optical characteristics of the optical fiber are parameters related to the characteristics of the light propagating through the optical fiber, and are, in one or more embodiments of the invention, the mode field diameter 2w of the light propagating through the optical fiber, the cutoff wavelength $\lambda_{cc}$ of the optical fiber, and the macrobend loss (bending loss) $\alpha_{BL}$ of the optical fiber.

The microbend loss of such an optical fiber may be represented by the value of sandpaper tension winding loss increase, which is the difference between the transmission loss measured in a state where the optical fiber is wound in one layer with a predetermined tension on a roughened bobbin body portion and the transmission loss measured in a state where the optical fiber is unwound from the bobbin with almost no tension applied. The smaller the value of such sandpaper tension winding loss increase becomes, the smaller is the microbend loss of the optical fiber.

By the way, as an optical fiber cable constituting communication infrastructures, a so-called tape slot type cable (RSCC: Ribbon Slotted Core Cable) including a plurality of tape core wires accommodated in each of a plurality of slots formed on a holding body for holding the tape core wires and a small-diameter high-density cable (UHDC: Ultra-High Density Cable) including tape core wires densely arranged inside the cable without using the aforementioned holding body are known. Of these, since the tape slot type cable has a structure in which a plurality of tape core wires are accommodated in the slots as described above, a lateral pressure is applied to the optical fibers constituting the tape core wires, which may cause microbend loss. Therefore, in the tape slot type cable, in consideration of such microbend loss, an optical fiber may be used in which the value of sandpaper tension winding loss increase is suppressed to 0.6 dB/km or less.

The relationship between the sandpaper tension winding loss increase and the aforementioned various parameters regarding the optical fiber used for the optical fiber cable were studied. As a result, it was found that the value of microbend loss characteristic factor $F_{\mu BL\_GO}$ represented by the aforementioned formula has a high correlation with the value of sandpaper tension winding loss increase. That is, the value of the microbend loss characteristic factor has a substantially positive slope proportional relationship with the value of sandpaper tension winding loss increase.

Furthermore, when the value of the aforementioned microbend loss characteristic factor is 2.6 ($[GPa^{-1} \cdot \mu m^{-10.5} \cdot dB/turn] \cdot 10^{-27}$), the value of the sandpaper tension winding loss increase is a value slightly smaller than 0.6 dB/km. As described above, the value of the microbend loss characteristic factor has a substantially positive slope proportional relationship with the value of sandpaper tension winding loss increase. Therefore, by setting the value of the microbend loss characteristic factor of the optical fiber to 2.6 ($[GPa^{-1} \cdot \mu m^{-10.5} \cdot dB/turn] \cdot 10^{-27}$) or less, the microbend loss can be suppressed to the extent that the optical fiber can be applied to the tape slot type cable.

As described above, with the optical fiber of one or more embodiments of the invention, the microbend loss can be suppressed.

Furthermore, the value of the microbend loss characteristic factor may be 1.3 ($[GPa^{-1} \cdot \mu m^{-10.5} \cdot dB/turn] \cdot 10^{-27}$) or less.

Among the optical fiber cables constituting the communication infrastructures, in the small-diameter high-density cable, the tape core wires are densely arranged as described above. Therefore, similar to the tape slot type cable, the optical fiber constituting the tape core wire is subjected to a lateral pressure, and the microbend loss can occur. Furthermore, since the small-diameter high-density cable is slotless as described above and all the tape core wires are densely arranged inside the cable, the optical fiber tends to be subjected to a large lateral pressure as compared with the tape slot type cable in which the tape core wires are separately arranged in a plurality of grooves. Therefore, in the small-diameter high-density cable, it is recommended to use an optical fiber having a smaller microbend loss than the optical fiber used for the tape slot type cable. In view of the above, in the small-diameter high-density cable, an optical fiber may be used in which the value of sandpaper tension winding loss increase is suppressed to 0.34 dB/km or less.

The value of the microbend loss characteristic factor substantially corresponding to the value (0.34 dB/km) of the sandpaper tension winding loss increase is 1.3 ($[GPa^{-1} \cdot \mu m^{-10.5} \cdot dB/turn] \cdot 10^{-27}$). Therefore, by setting the value of the microbend loss characteristic factor of the optical fiber to 1.3 ($[GPa^{-1} \cdot \mu m^{-10.5} \cdot dB/turn] \cdot 10^{-27}$) or less, the microbend loss can be suppressed to the extent that the optical fiber can also be applied to the small-diameter high-density cable.

Furthermore, in the aforementioned optical fiber, the coating thickness of a sum of the thickness of the primary coating layer and the thickness of the secondary coating layer may be 42.0 μm or less.

The larger the aforementioned coating thickness becomes, the larger the outside diameter of the optical fiber tends to be, and the smaller the coating thickness becomes, the smaller the outside diameter of the optical fiber tends to be. The optical fiber used for the optical fiber cable constituting the communication infrastructures generally has a coating thickness of approximately 60 μm. Therefore, when the coating thickness is 42.0 μm or less, it is possible to realize an optical fiber having a smaller diameter than a general optical fiber constituting the communication infrastructures. By the way, the value of the microbend loss characteristic factor is determined by various parameters as described above, and the parameters include the thickness of the primary coating layer and the thickness of the secondary coating layer. Therefore, according to one or more embodiments of the invention, even when the thickness of the primary coating layer or the thickness of the secondary coating layer is reduced, the value of the microbend loss characteristic factor can be 2.6 ($[GPa^{-1} \cdot \mu m^{-10.5} \cdot dB/turn] \cdot 10^{-27}$) or less or can be 1.3 ($[GPa^{-1} \cdot \mu m^{-10.5} \cdot dB/turn] \cdot 10^{-27}$) or less by adjusting other parameters. Therefore, even when the coating thickness of the optical fiber in one or more embodiments of the invention is 42.0 μm or less, the microbend loss can be suppressed to the extent that the optical fiber can be used for the tape slot type cable or the small-diameter high-density cable.

Furthermore, the coating thickness may be 38.0 μm or less.

Furthermore, the coating thickness may be 36.5 μm or less.

Furthermore, the coating thickness may be 34.5 μm or less.

Furthermore, the coating thickness may be 34.0 μm or less.

By reducing the coating thickness in this way, the microbend loss can be suppressed to the extent that the optical fiber can be used for the tape slot type cable or the small-diameter high-density cable, and an optical fiber with a smaller diameter can be realized.

Furthermore, when the coating thickness is 42.0 μm or less, the outside diameter of the glass portion may be 65 μm or more and 100 μm or less.

The larger the outside diameter of the aforementioned glass portion becomes, the larger the outside diameter of the optical fiber tends to be, and the smaller the outside diameter of the glass portion becomes, the smaller the outside diameter of the optical fiber tends to be. The optical fiber used for the optical fiber cable constituting the communication infrastructures is generally formed such that the outside diameter of the glass portion is approximately 125 μm. Therefore, when the coating thickness is 42.0 μm or less and the outside diameter of the glass portion is 100 μm or less, it is possible to realize an optical fiber having a smaller diameter than a general optical fiber constituting the communication infrastructures. By the way, the value of the microbend loss characteristic factor is determined by various parameters as described above, and the parameters include the coating thickness and the outside diameter of the glass portion. Therefore, according to one or more embodiments of the invention, even when the coating thickness is reduced and the outside diameter of the glass portion is reduced, the value of the microbend loss characteristic factor can be 2.6 ($[GPa^{-1} \cdot \mu m^{-10.5} \cdot dB/turn] \cdot 10^{-27}$) or less or can be 1.3 ($[GPa^{-1} \cdot \mu m^{-10.5} \cdot dB/turn] \cdot 10^{-27}$) or less by adjusting other parameters. Therefore, even when the coating thickness of the optical fiber in one or more embodiments of the invention is 42.0 μm or less and the outside diameter of the glass portion is 100 μm or less, the microbend loss can be suppressed to the extent that the optical fiber can be used for the tape slot type cable or the small-diameter high-density cable.

Note that when the outside diameter of a glass portion having brittleness is as thin as approximately 65 μm, the mechanical bending resistance of the optical fiber can be increased by the amount that the brittle glass is thinned.

Furthermore, the outside diameter of the glass portion may be 90 μm or less.

Furthermore, the outside diameter of the glass portion may be 80 μm or less.

Furthermore, the outside diameter of the glass portion may be 75 μm or less.

Furthermore, the outside diameter of the glass portion may be 70 μm or less.

By reducing the outside diameter of the glass portion in this way, the microbend loss can be suppressed to the extent that the optical fiber can be used for the tape slot type cable or the small-diameter high-density cable, and an optical fiber with a far smaller diameter can be realized.

Furthermore, when the aforementioned coating thickness is 42.0 μm or less, the mode field diameter of light having a wavelength of 1310 nm may be 7.6 μm or more and 8.7 μm or less, the cable cutoff wavelength may be 1260 nm or less, the zero dispersion wavelength may be 1300 nm or more and 1324 nm or less, and the zero dispersion slope may be 0.073 ps/km/nm or more and 0.092 ps/km/nm or less.

In this case, the macrobend loss of light having a wavelength of 1625 nm by bending at a radius of 10 mm may be 1.5 dB/turn or less.

Alternatively, the macrobend loss of light having a wavelength of 1625 nm by bending at a radius of 10 mm may be 0.2 dB/turn or less.

Alternatively, the macrobend loss of light having a wavelength of 1625 nm by bending at a radius of 10 mm may be 0.1 dB/turn or less.

As described above, according to one or more embodiments of the invention, there is provided an optical fiber capable of suppressing the microbend loss.

DETAILED DESCRIPTION

Aspects for carrying out the optical fiber according to the present invention will be illustrated below together with the accompanying drawings. The embodiments illustrated below are for facilitating the understanding of the present invention, and are not for limiting the interpretation of the present invention. The present invention can be changed or modified from the embodiments below without departing from the spirit. Furthermore, in the present specification, the dimensions of each member may be exaggerated for ease of understanding.

First Embodiment

Figure 1:
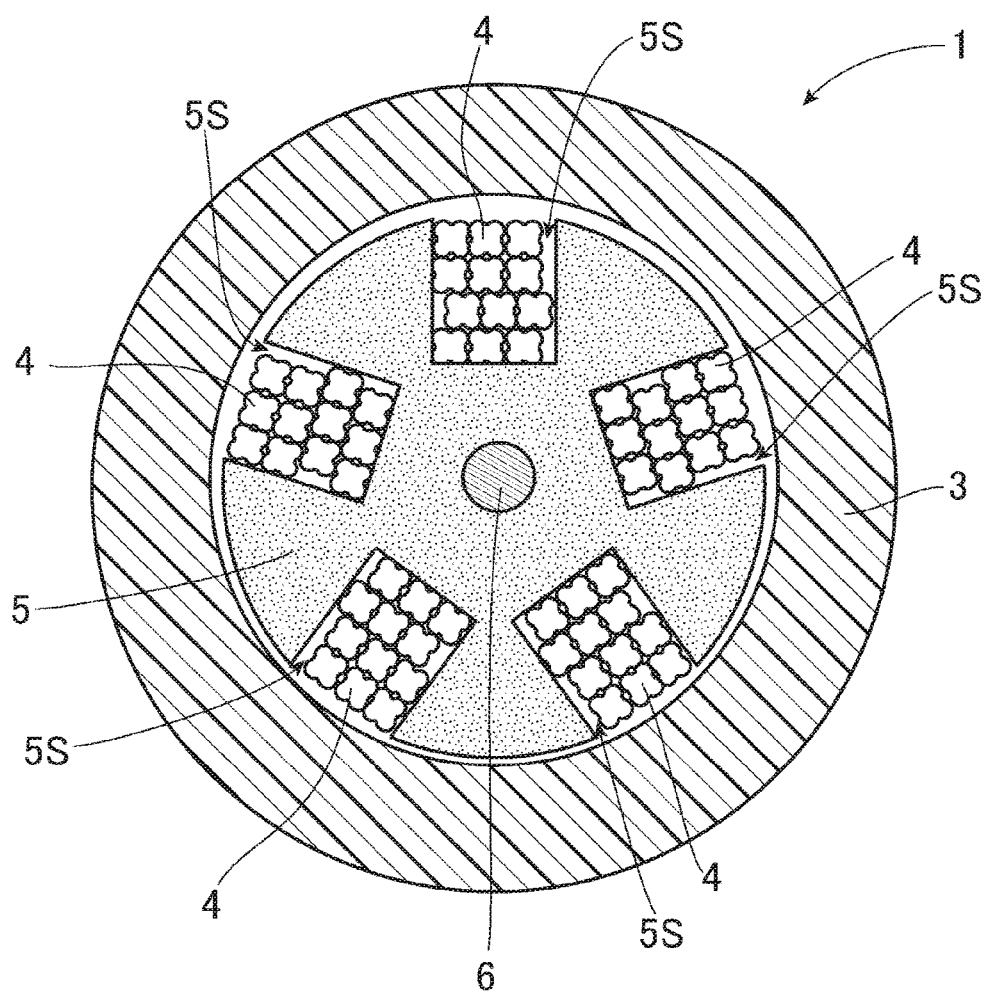
FIG. 1 is a diagram schematically showing a structure of a cross section perpendicular to a longitudinal direction of an optical fiber cable according to a first embodiment.

FIG. 1 is a diagram schematically showing a structure of a cross section perpendicular to a longitudinal direction of an optical fiber cable 1 according to the first embodiment. As shown in FIG. 1, the optical fiber cable 1 is a so-called tape slot type cable (RSCC: Ribbon Slotted Core Cable). The optical fiber cable 1 includes a sheath 3, a plurality of tape core wires 4, a holding body 5, and a tensile strength body 6 as main configurations.

The sheath 3 is a tubular member and may be formed of a thermoplastic resin such as polyethylene. The aforementioned holding body 5 is accommodated in the internal space of the sheath 3. In this way, the sheath 3 accommodates the holding body 5 inside and protects the holding body 5.

The holding body 5 is a member that holds the plurality of tape core wires 4. A plurality of slots 5S are formed on the holding body 5, and the plurality of tape core wires 4 are accommodated in the slots 5S. Note that by increasing the number of tape core wires 4 accommodated in the slots 5S, the number of cores of optical fiber included in the optical fiber cable 1 can be increased.

In the present embodiment, the tensile strength body 6 is embedded in the substantially center of the holding body in the cross-sectional view of FIG. 1. Such tensile strength body 6 can suppress the tape core wires 4 from being stretched more than necessary when tension is applied in the longitudinal direction of the tape core wires 4.

Figure 2:
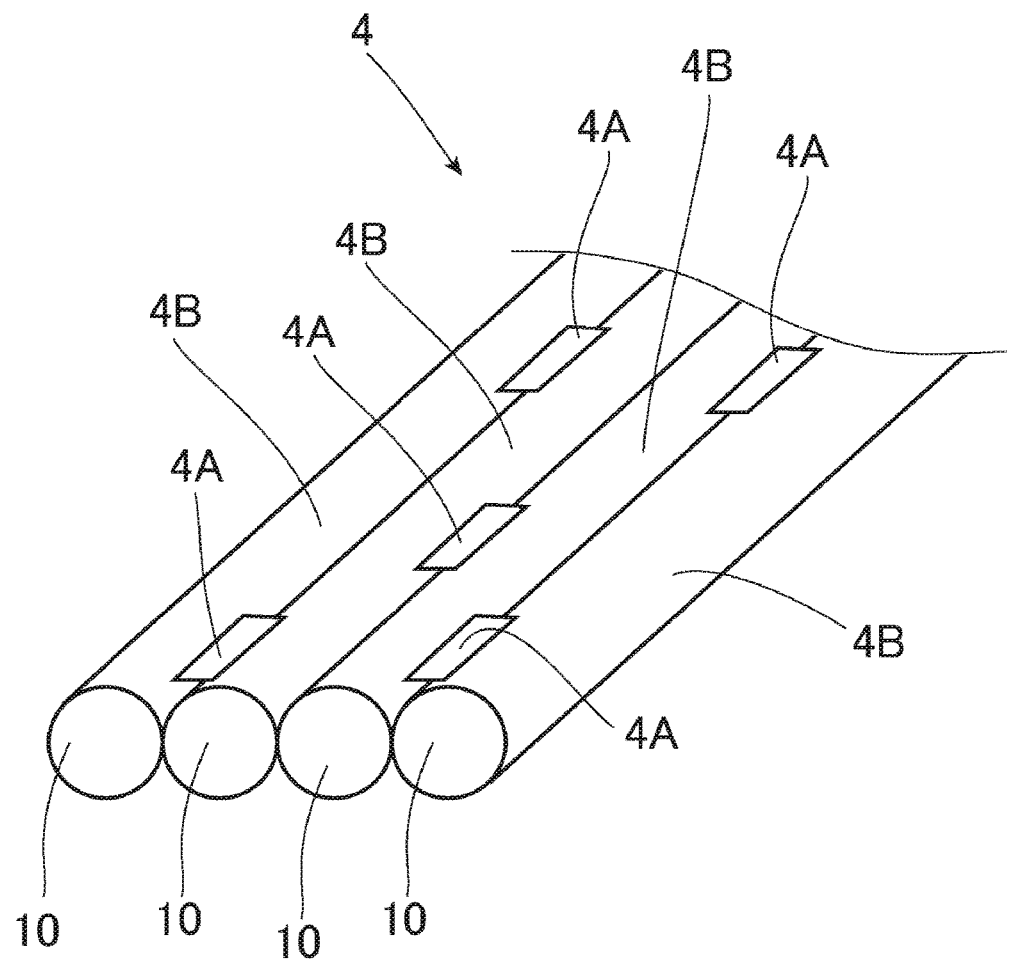
FIG. 2 is a perspective view schematically showing an example of an optical fiber tape core wire included in the optical fiber cable shown in FIG. 1.

FIG. 2 is a perspective view schematically showing an example of the tape core wire 4. As shown in FIG. 2, the tape core wire 4 of the present embodiment is a so-called intermittent adhesive type tape core wire. The tape core wire 4 has a configuration in which a plurality of optical fibers 10 are arranged along a direction perpendicular to the longitudinal direction, and the arranged optical fibers 10 are adhered to each other. The tape core wire 4 includes adhesive portions 4A and single core portions 4B. The adhesive portion 4A is a portion where adjacent optical fibers 10 are adhered to each other, and is provided intermittently at a constant pitch along the longitudinal direction. The single core portion 4B is a portion located between the adhesive portions 4A, and is a portion where the optical fibers 10 are not adhered to each other. With such a configuration, the tape core wire 4 can be easily deformed, for example, twisted or bundled in a substantially cylindrical shape. FIG. 1 schematically shows a state in which each tape core wire 4 is bundled.

Note that FIG. 2 shows an example in which the tape core wire 4 includes four optical fibers 10, but this is an example. That is, the number of optical fibers 10 constituting the tape core wire 4 is not particularly limited, and may be less than four or may be more than four. For example, the tape core wire 4 may include 12-core optical fibers 10. Furthermore, the tape core wire 4 is not limited to the intermittent adhesive type.

Figure 3:
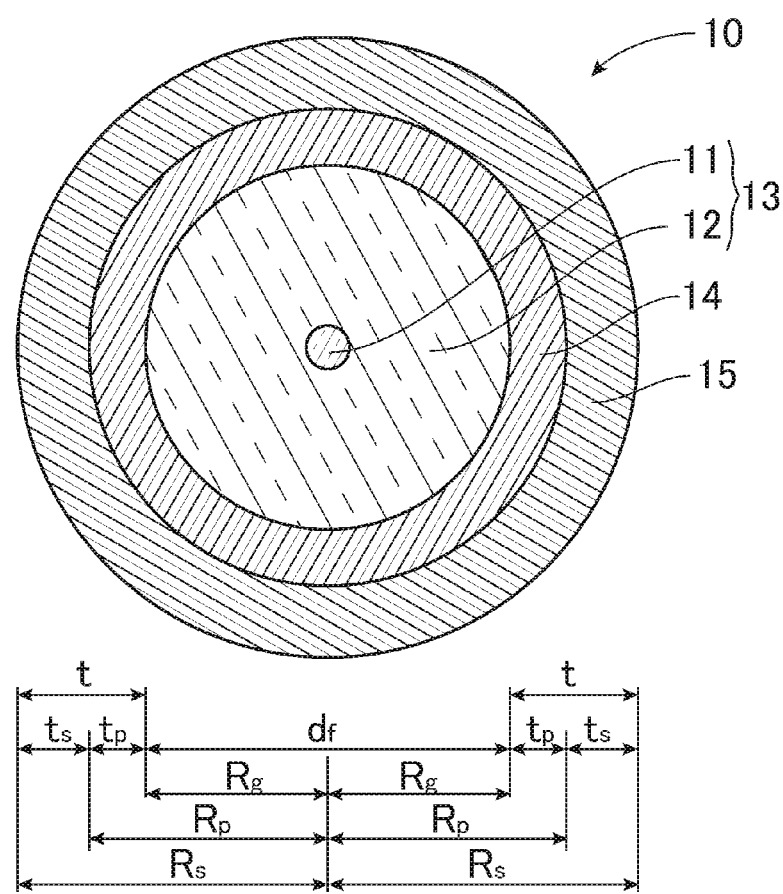
FIG. 3 is a diagram schematically showing a structure of a cross section perpendicular to the longitudinal direction of the optical fiber included in the optical fiber tape core wire shown in FIG. 2.

FIG. 3 is a diagram showing a structure of a cross section perpendicular to the longitudinal direction of the optical fiber 10 constituting the tape core wire 4. The optical fiber 10 of the present embodiment is a single-mode optical fiber. As shown in FIG. 3, the optical fiber 10 includes a core 11, a clad 12 that surrounds the core 11 without gaps, a primary coating layer 14 that covers the clad 12, and a secondary coating layer 15 that covers the primary coating layer 14 as the main configurations. In the optical fiber 10, the clad 12 has a lower refractive index than the core 11.

The core 11 may be formed of pure quartz to which no dopant has been added, or may be formed of quartz to which germanium (Ge) or the like that increases the refractive index has been added as a dopant.

The clad 12 has a lower refractive index than the core 11 as described above. For example, when the core 11 is formed of pure quartz, the clad 12 may be formed of quartz to which fluorine (F), boron (B), or the like that lowers the refractive index has been added as a dopant, and when the core 11 is formed of quartz to which germanium (Ge) or the like that increases the refractive index has been added as a dopant, the clad 12 may be formed of pure quartz to which no dopant has been added. Furthermore, the clad 12 may be formed of quartz to which chlorine (Cl2) has been added. Furthermore, the clad 12 may be a single layer, may include a plurality of layers having different refractive indexes, or may be a hole-assisted type.

As described above, the core 11 and the clad 12 are both formed of quartz (glass). Therefore, the core 11 and the clad 12 are collectively referred to as a glass portion 13. That is, the glass portion 13 includes the core 11 and the clad 12, and the glass portion 13 is covered with the primary coating layer 14. Note that the glass portion 13 is sometimes referred to as an optical fiber bare wire portion. The outside diameter (diameter) $d_f$ of such glass portion 13 is generally approximately 125 μm. However, in the present embodiment, the outside diameter $d_f$ of the glass portion 13 can be a smaller outside diameter. For example, it can be 65 μm or more and 100 μm or less, 65 μm or more and 90 μm or less, 65 μm or more and 80 μm or less, 65 μm or more and 75 μm or less, or 65 μm or more and 70 μm or less. The reason why the outside diameter $d_f$ of the glass portion 13 can be small in this way will be described later.

Note that when the outside diameter $d_f$ of a glass portion having brittleness is as thin as approximately 65 μm, the mechanical bending resistance of the optical fiber can be increased by the amount that the brittle glass is thinned.

The primary coating layer 14 is formed of, for example, an ultraviolet curable resin or a thermosetting resin, and is formed on an outer side of the glass portion 13 with a thickness $t_p$ (μm). In the present embodiment, the Young's modulus $E_g$ of the primary coating layer 14 is lower than the Young's modulus $E_s$ of the secondary coating layer 15. By setting the primary coating layer 14 in direct contact with the glass portion to have a low Young's modulus in this way, the primary coating layer 14 acts as a cushioning material, and the external force acting on the glass portion 13 can be reduced. Note that assuming that the radius of the outer peripheral surface of the primary coating layer 14 is $R_p$ (μm), the outside diameter of the primary coating layer 14 is represented by $2R_p$, and assuming that the radius ($d_f \times ½$) of the glass portion is $R_g$ (μm), the aforementioned thickness $t_p$ of the primary coating layer 14 is represented by the formula described below.

$t_p = R_p - R_g$

In the present embodiment, the secondary coating layer 15 is a layer forming the outermost layer of the optical fiber 10, and is formed of, for example, an ultraviolet curable resin or a thermosetting resin different from the type of resin forming the primary coating layer 14, and is formed on an outer side of the primary coating layer 14 with a thickness $t_s$ (μm). For example, when the primary coating layer 14 is formed of an ultraviolet curable resin, the secondary coating layer 15 may be formed of an ultraviolet curable resin different from the ultraviolet curable resin forming the primary coating layer 14, and when the primary coating layer 14 is formed of a thermosetting resin, the secondary coating layer 15 may be formed of a thermosetting resin different from that of the primary coating layer 14. In the present embodiment, the Young's modulus $E_s$ of the secondary coating layer 15 is higher than the Young's modulus $E_g$ of the primary coating layer 14. As described above, by setting the secondary coating layer 15 forming the outermost layer of the optical fiber 10 to have a high Young's modulus, the glass portion 13 can be appropriately protected from the external force. Note that assuming that the radius of the outer peripheral surface of the secondary coating layer 15 is $R_s$, the outside diameter of the secondary coating layer 15, i.e., the outside diameter of the optical fiber 10 is represented by $2R_s$, and the aforementioned thickness $t_s$ of the secondary coating layer 15 is represented by the formula described below.

$t_s = R_s - R_p$

By the way, the outside diameter of the optical fiber used for the optical fiber cable is generally approximately 240 μm to 250 μm. Therefore, the outside diameter of the secondary coating layer 15 may be approximately 240 μm. However, in the present embodiment, the outside diameter of the secondary coating layer 15 can be smaller than 240 μm. For example, it can be approximately 190 μm, approximately 150 μm to approximately 160 μm, or approximately 125 μm. The reason why the outside diameter of the secondary coating layer 15, i.e., the outside diameter of the optical fiber 10 can be small in this way will be described later.

Furthermore, assuming that the sum of the thickness $t_p$ of the primary coating layer 14 and the thickness $t_s$ of the secondary coating layer 15 is the coating thickness t, the coating thickness of the optical fiber used for the optical fiber cable is generally approximately 60 μm. Therefore, the coating thickness t of the optical fiber 10 may be approximately 60 μm. However, in the present embodiment, the coating thickness t of the optical fiber 10 can be smaller than 60 μm. For example, it can be 42.5 μm or less, 38.0 μm or less, 36.5 μm or less, 34.5 μm or less, or 34.0 μm or less. The reason why the coating thickness of the optical fiber 10 can be small in this way will be described later.

As described above, in the optical fiber cable 1 of the present embodiment, the tape core wires 4 including a plurality of such optical fibers 10 are densely accommodated in the slots 5S of the holding body 5. As a result, the optical fiber cable 1 can accommodate a large number of cores of optical fiber. For example, the optical fiber cable 1 accommodates 1000-core or more optical fibers. Furthermore, as described above, in the optical fiber 10 of the present embodiment, the glass portion 13 can be formed to have an outside diameter smaller than that of the glass portion of a general optical fiber, and the coating thickness can be formed to be smaller than the coating thickness of a general optical fiber. Therefore, the outside diameter of the optical fiber 10 can be smaller than the outside diameter of a general optical fiber, and the diameter of the optical fiber 10 can be reduced. By reducing the diameter of the optical fiber 10 in this way, the size of the tape core wire 4 can be smaller than the size of a general tape core wire. Therefore, the tape core wires 4 having such a small size are accommodated in the slots 5S, and the number of cores of optical fiber accommodated in the optical fiber cable 1 can be further increased. Alternatively, the tape core wires 4 having such a small size are accommodated in the slots 5S, and the size of the optical fiber cable 1 can be reduced.

On the other hand, as the accommodation density of the tape core wires in the slots increases, the lateral pressure acting on the optical fiber tends to increase. When the optical fiber receives the lateral pressure in this way, the shaft of the optical fiber is slightly bent, and the microbend loss can occur. Furthermore, when the outside diameter of the glass portion of the optical fiber or the coating thickness of the optical fiber is reduced, the glass portion is susceptible to the lateral pressure, and eventually the microbend loss can occur.

However, the optical fiber 10 of the present embodiment is formed so that the value of the microbend loss characteristic factor $F_{\mu BL\_GO}$ described later is 1.3 ([GPa$^{-1}$·µm$^{-10.5}$·dB/turn]·10$^{27}$) or less. Therefore, even when the outside diameter of the glass portion and the coating thickness are reduced and the number of cores of the optical fiber 10 accommodated in the slots 5S is increased, the microbend loss can be suppressed. The reason for this will be described in detail below.

The microbend loss of optical fiber is, as described in Non-Patent Literature 1 (J. Baldauf, et al., "Relationship of Mechanical Characteristics of Dual Coated Single Mode Optical Fibers and Microbending Loss, "IEICE Trans. Commun., vol. E76-B, No. 4, 1993) and Non-Patent Literature 2 (C. Unger, et al., "Characterization of the bending sensitivity of fibers by the MAC-value, "Optics Communications vol. 107, no. 5-6, pp. 361-364, 1994), tends to be affected by both the geometry and the optical characteristics of the optical fiber.

Here, the geometry of the optical fiber is a parameter related to the structure of the optical fiber, and is, in the present embodiment, the spring coefficient κs of the primary coating layer of the optical fiber, the bending rigidity $H_f$ of the glass portion, the deformation resistance Do of the secondary coating layer, the bending rigidity $H_0$ of the secondary coating layer, the Young's modulus $E_g$ of the glass portion, the Young's modulus $E_p$ of the primary coating layer, the Young's modulus $E_s$ of the secondary coating layer, the outside diameter $d_f$ of the glass portion (diameter of the glass portion), the radius $R_p$ of the primary coating layer, the radius $R_s$ of the secondary coating layer, the thickness $t_p$ of the primary coating layer, and the thickness $t_s$ of the secondary coating layer.

Furthermore, the optical characteristics of the optical fiber are parameters related to the characteristics of the light propagating through the optical fiber, and are, in the present embodiment, the mode field diameter 2w of the light propagating through the optical fiber, the cutoff wavelength $\lambda_{cc}$ of the optical fiber, and the macrobend loss (bending loss) $\alpha_{BL}$ of the optical fiber.

The microbend loss of such an optical fiber may be represented by the value of sandpaper tension winding loss increase, which is the difference between the transmission loss measured in a state where the optical fiber is wound in one layer with a predetermined tension on a roughened bobbin body portion and the transmission loss measured in a state where the optical fiber is unwound from the bobbin with almost no tension applied. The smaller the value of such sandpaper tension winding loss increase becomes, the smaller is the microbend loss of the optical fiber.

By the way, the tape slot type cable (RSCC) such as the optical fiber cable 1 of the present embodiment can cause the microbend loss as described above. Therefore, the tape slot type cable has the required characteristics that the value of sandpaper tension winding loss increase is 0.6 dB/km or less in consideration of such microbend loss.

The relationship between the sandpaper tension winding loss increase and the aforementioned various parameters regarding the optical fiber used for the optical fiber cable were studied. As a result, it was found that a value of microbend loss characteristic factor $F_{\mu BL\_GO}$ represented by the formula (3) below $$F_{\mu BL\_GO} = F_{\mu BL\_G} \times F_{\mu BL\_O} \quad (3)$$

by using geometry microbend loss characteristic $F_{\mu BL\_G}$ determined by the formula (1) below $$F_{\mu BL\_G} = \frac{K_S^2}{H_f^2 \times D_0^{1.125-0.25\mu} \times H_0^{0.25-0.125}} \quad (1)$$

$$K_s = \frac{E_p d_f}{t_p}, H_f = \frac{\pi}{4} E_g \left(\frac{d_f}{2}\right)^4,$$

$$D_0 = E_p + \left(\frac{t_s}{R_s}\right)^3 E_s, H_0 = \frac{\pi}{4} E_s (R_s^4 - R_p^4)$$

related to a spring coefficient κs of the primary coating layer, a bending rigidity $H_f$ of the glass portion, a deformation resistance Do of the secondary coating layer, a bending rigidity $H_0$ of the secondary coating layer, a Young's modulus $E_g$ of the glass portion, a Young's modulus $E_p$ of the primary coating layer, a Young's modulus $E_s$ of the secondary coating layer, an outside diameter $d_f$ of the glass portion, a radius $R_p$ of the outer peripheral surface of the primary coating layer, a radius $R_s$ of the outer peripheral surface of the secondary coating layer, a thickness $t_p$ of the primary coating layer, and a thickness $t_s$ of the secondary coating layer, which are parameters related to geometry, and optical microbend loss characteristic $F_{\mu BL\_O}$ determined by the formula (2) below $$F_{\mu BL\_O} = \frac{2w}{\lambda_{cc}} \times \alpha_{BL} \quad (2)$$

related to a mode field diameter 2w, a cutoff wavelength $\lambda_{cc}$ of the optical fiber, and a macrobend loss $\alpha_{BL}$, which are parameters related to optical characteristics, has a high correlation with the value of sandpaper tension winding loss increase. That is, the value of the microbend loss characteristic factor has a substantially positive slope proportional relationship with the value of sandpaper tension winding loss increase.

Note that according to Non-Patent Literature 3 (K. Kobayashi, et al., "Study of Microbending loss in thin coated fibers and fiber ribbons," IWCS, pp. 386-392, 1993), the typical value of the constant μ in the aforementioned formula (1) is "3". Therefore, the aforementioned formula (1) becomes the formula (4) described below.

$$F_{\mu BL\_G} = \frac{K_S^2}{H_f^2 \times D_0^{0.375} \times H_0^{0.625}} \quad (4)$$

$$K_s = \frac{E_p d_f}{t_p},\ H_f = \frac{\pi}{4} E_g \left(\frac{d_f}{2}\right)^4,$$

$$D_0 = E_p + \left(\frac{t_s}{R_s}\right)^3 E_s,\ H_0 = \frac{\pi}{4} E_s (R_s^4 - R_p^4)$$

Furthermore, when the value of the aforementioned microbend loss characteristic factor is 2.6 ([GPa$^{-1}$·μm$^{-10.5}$·dB/turn]·10$^{27}$), the value of the sandpaper tension winding loss increase is a value slightly smaller than 0.6 dB/km. As described above, the value of the microbend loss characteristic factor has a substantially positive slope proportional relationship with the value of sandpaper tension winding loss increase. Therefore, by setting the value of the microbend loss characteristic factor of the optical fiber to 2.6 ([GPa$^{-1}$·μm$^{-10.5}$·dB/turn]·10$^{27}$) or less, the microbend loss can be suppressed to the extent that the required characteristics of the tape slot type cable are satisfied.

As described above, the optical fiber 10 of the present embodiment is formed so that the value of the microbend loss characteristic factor $F_{\mu BL\_GO}$ is 2.6 ([GPa$^{-1}$·μm$^{-10.5}$·dB/turn]·10$^{-27}$) or less. Therefore, in the optical fiber of the present embodiment, the microbend loss can be suppressed to the extent that the required characteristics of the tape slot type cable are satisfied. Therefore, the optical fiber cable 1 using the optical fiber 10 can exhibit favorable optical characteristics.

Furthermore, as described above, in the optical fiber 10 of the present embodiment, even when the outside diameter $d_f$ of the glass portion 13 is made smaller than 125 μm or the coating thickness t is made smaller than 60 μm, because parameters other than the outside diameter $d_f$ of the glass portion and the coating thickness t are adjusted so that the value of the microbend loss characteristic factor $F_{\mu BL\_GO}$ is 2.6 ([GPa$^{-1}$·μm$^{-10.5}$·dB/turn]·10$^{-27}$) or less, the microbend loss can be suppressed to the extent that the required characteristics of the tape slot type cable are satisfied. Here, as shown in FIG. 3, the outside diameter $2R_S$ of the optical fiber 10 is represented by $$2R_s = d_f + 2t$$

using the outside diameter $d_f$ of the glass portion and the coating thickness t. Therefore, as described above, the diameter of the optical fiber can be reduced by reducing the coating thickness t and the outside diameter $d_f$ of the glass portion. Therefore, by using the optical fiber 10 whose diameter is reduced and microbend loss is suppressed in this way, a tape slot type cable having excellent optical characteristics that realizes an increase in the number of cores and a small size can be configured.

Second Embodiment

Figure 4:
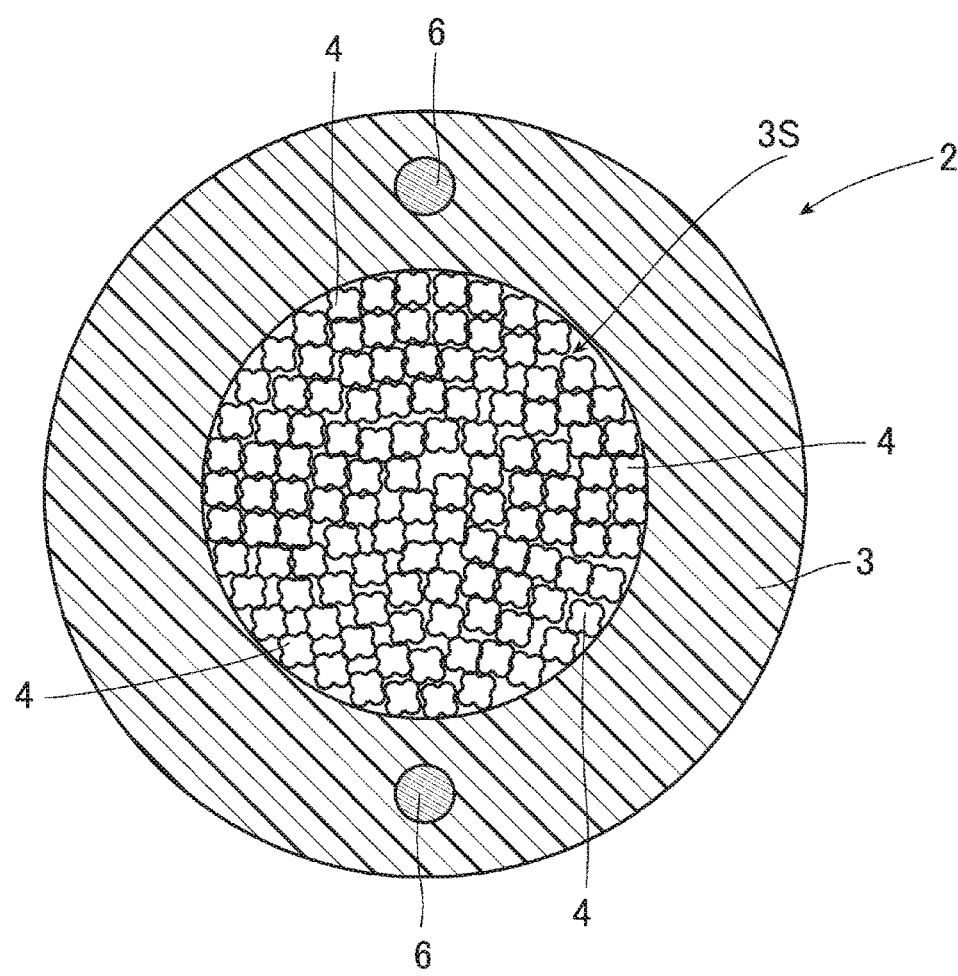
FIG. 4 is a diagram showing a structure of a cross section perpendicular to a longitudinal direction of an optical fiber cable according to a second embodiment.

Next, the second embodiment will be described with reference to FIG. 4. FIG. 4 is a diagram schematically showing a structure of a cross section perpendicular to a longitudinal direction of an optical fiber cable 2 according to the present embodiment. Note that the same or equivalent components as those of the first embodiment are designated by the same reference numerals and duplicated description will be omitted unless otherwise specified.

As shown in FIG. 4, the optical fiber cable 2 of the present embodiment has the same configuration as the optical fiber cable 1 of the first embodiment in that tape core wires 4 having substantially the same configuration as that of the first embodiment are accommodated inside. However, the optical fiber cable 2 is mainly different from the optical fiber cable 1 on the points described below.

The optical fiber cable 1 is a tape slot type cable (RSCC) as described above. On the other hand, as shown in FIG. 4, the optical fiber cable 2 of the present embodiment does not have the holding body 5. That is, the optical fiber cable 2 is a so-called small-diameter high-density cable (UHDC: Ultra-High Density Cable) in which the tape core wires are not accommodated in the slots of the holding body but are directly accommodated in the sheath. That is, an accommodation space 3S is formed inside the sheath 3 of the optical fiber cable 2, and a plurality of tape core wires 4 are arranged in the accommodation space 3S. Note that the tensile strength bodies 6 may be embedded in the sheath 3 of the optical fiber cable 2 at positions facing each other across the center of the optical fiber cable 2.

Furthermore, as described above, the tape core wire 4 of the present embodiment has substantially the same configuration as the tape core wire 4 of the first embodiment. However, the value of the microbend loss characteristic factor $F_{\mu BL\_GO}$ of the optical fiber 10 included in the tape core wire 4 of the present embodiment is 1.3 ([GPa$^{-1}$·μm$^{-10.5}$·dB/turn]·10$^{-27}$) or less for the reason described later.

Since the small-diameter high-density cable such as the optical fiber cable 2 does not have the holding body 5 as described above and is slotless, the tape core wires 4 can be densely arranged in the accommodation space 3S of the sheath 3. Therefore, a large number of tape core wires can be accommodated as compared with the tape slot type cable such as the optical fiber cable 1.

On the other hand, in the small-diameter high-density cable, since many tape core wires are densely arranged in one place as described above, a large lateral pressure tends to be applied to the optical fiber as compared with the tape slot type cable. Therefore, in the small-diameter high-density cable, it is recommended to use an optical fiber having a smaller microbend loss than the optical fiber used for the tape slot type cable. In view of the above, the small-diameter high-density cable has the required characteristics that the value of the aforementioned sandpaper tension winding loss increase is 0.34 dB/km or less.

The value of the microbend loss characteristic factor $F_{\mu BL\_GO}$ corresponding to the value (0.34 dB/km) of the sandpaper tension winding loss increase may be calculated on the basis of the aforementioned formulae (2) to (4) and the value may be 1.3 ([GPa$^{-1}$·μm$^{-10.5}$·dB/turn]·10$^{-27}$). That is, by setting the value of the microbend loss characteristic factor $F_{\mu BL\_GO}$ to 1.3 ([GPa$^{-1}$·μm$^{-10.5}$·dB/turn]·10$^{-27}$) or less, the microbend loss can be suppressed to the extent that the required characteristics of the small-diameter high-density cable are satisfied.

As described above, the optical fiber 10 of the present embodiment is configured so that the aforementioned various parameters are adjusted so that the value of the microbend loss characteristic factor $F_{\mu BL\_GO}$ is 1.3 ([GPa$^{-1}$·

μm$^{-10.5}$·dB/turn]·10$^{-27}$) or less. Therefore, the microbend loss can be suppressed to the extent that the required characteristics of the small-diameter high-density cable are satisfied. Therefore, the optical fiber cable 2 using the optical fiber 10 can exhibit favorable optical characteristics.

Furthermore, as described above, in the optical fiber 10 of the present embodiment, even when the optical fiber 10 has a reduced diameter by making the outside diameter $d_f$ of the glass portion 13 smaller than 125 μm and the coating thickness t smaller than 57.5 μm, the microbend loss can be suppressed to the extent that the required characteristics of the small-diameter high-density cable are satisfied. Therefore, by using the optical fiber 10 whose diameter is reduced in this way, a small-diameter high-density cable having excellent optical characteristics that realizes an increase in the number of cores and a small size can be configured.

Next, the reason why the outside diameter $d_f$ of the glass portion 13 can be small, the reason why the coating thickness of the optical fiber 10 can be small, the reason why the outside diameter of the optical fiber 10 can be small, and the like will be described.

The following Examples 1 to 48 are performed in order to verify the relationship between the value of the microbend loss characteristic factor $F_{\mu BL\_GO}$ and the value of the sandpaper tension winding loss increase $\alpha_{\mu BL}$. Note that embodiments of the invention are not limited to Examples 1 to 48.

Examples 1 to 22

Samples 1 to 22 of optical fiber were prepared in which the aforementioned various parameters were changed, measured the value of sandpaper tension winding loss increase for each of Samples 1 to 22, and calculated the value of the microbend loss characteristic factor $F_{\mu BL\_GO}$ on the basis of the aforementioned formulae (2) to (4). The optical fiber of Sample 1 is the optical fiber of Example 1, and the optical fiber of Sample 2 is the optical fiber of Example 2. Thus, the sample numbers of the optical fibers correspond to the numbers of the Examples. Note that the optical fiber of Sample 8 is an optical fiber generally used for an optical fiber cable constituting the communication infrastructures, and has an outside diameter of the glass portion of 125 μm and a coating thickness of 57.5 μm. The optical fiber of Sample 8 may be referred to as the "general optical fiber".

The test for sandpaper tension winding loss increase was performed in the manner described below. That is, first, sandpaper (SiC having an average particle diameter of 50 μm (for example, model number #360)) was wound around the bobbin body portion having a body diameter of 380 mm, and one layer of optical fiber wire was wound therearound at 100 gf, and light having a wavelength of 1550 nm was caused to propagate. The transmission loss at this time was measured. Thereafter, the optical fiber wire was unwound from the bobbin, light having a wavelength of 1550 nm was caused to propagate with almost no tension applied, and the transmission loss was measured. Then, the difference between these transmission losses was obtained, and the value of this difference was defined as sandpaper tension winding loss increase $\alpha_{\mu BL}$.

Tables 1 to 5 below show the parameter specifications for each of Samples 1 to 22, the values of the microbend loss characteristic factor $F_{\mu BL\_GO}$ for each of Samples 1 to 22, and the values of sandpaper tension winding loss increase $\alpha_{\mu BL}$ for each of Samples 1 to 22.

Note that in Tables 1 to 5 below and Tables 7 to 10 described below, mode field diameter (MFD), cutoff wavelength, macrobend loss, and the like are as described below. The mode field diameter is the mode field diameter of light in the LP01 mode when light having a wavelength of 1310 nm is caused to propagate through the optical fiber.

Note that the aforementioned mode field diameter is expressed by Petermann II definition formula (formula (5) below) in ITU-T Recommendation G.650.1. Here, E(r) represents the electric field strength at the point where the distance from the central axis of the optical fiber is r.

$$MFD = 2w = 2\sqrt{\frac{2\int_0^\infty E^2(r)rdr}{\int_0^\infty [dE(r)/dr]^2 rdr}} \quad (5)$$

Furthermore, the aforementioned cutoff wavelength indicates the minimum wavelength at which the high-order mode is sufficiently attenuated. This high-order mode refers to, for example, LP11 mode. Specifically, it is the minimum wavelength at which the loss of the high-order mode is 19.3 dB. The cutoff wavelength includes a fiber cutoff wavelength and a cable cutoff wavelength, and can be measured by, for example, the measurement method described in ITU-T Recommendation G.650. The cutoff wavelengths described in Tables 1 to 5 are cable cutoff wavelengths. Furthermore, the MAC value is the ratio of the mode field diameter 2w at a wavelength of 1310 nm to the cable cutoff wavelength $\lambda_{cc}$ and is defined as $2w/\lambda_{cc}$. Furthermore, the macrobend losses shown in Tables 1 to 5 are the bend loss of light caused by light having a wavelength of 1625 nm propagating through a bent portion formed when the optical fiber is bent with a radius of 10 mm. The unit "/turn" of macrobend loss means "per turn of optical fiber". Furthermore, the propagation constant difference is the difference between the propagation constant of light having a wavelength of 1550 nm in the waveguide mode and the propagation constant of light having a wavelength of 1550 in the radiation mode, and, in this experiment, is the difference between the propagation constant of light having a wavelength of 1550 nm in the LP01 mode and the propagation constant in the LP11 mode. The propagation constant was calculated using the two-dimensional finite element method described in Non-Patent Literature 4 (K. Saitoh and M. Koshiba, "Full-Vectorial Imaginary-Distance Beam Propagation Method Based on a Finite Element Scheme: Application to Photonic Crystal Fibers," IEEE J. Quant. Elect. vol. 38, pp. 927-933, 2002) on the basis of the refractive index profile of a prototyped optical fiber. The zero dispersion wavelength refers to a wavelength at which the value of the wavelength dispersion becomes zero. Here, the wavelength dispersion is the sum of material dispersion and waveguide dispersion. Furthermore, the zero dispersion slope refers to the rate of change of wavelength dispersion with respect to the wavelength at the zero dispersion wavelength.

TABLE 1

| Example | 1 | 2 | 3 | 4 | 5 |
|---|---|---|---|---|---|
| Outside diameter of glass portion(μm) | 80 | 80 | 80 | 125 | 80 |
| Outside diameter of primary coating layer(μm) | 125 | 115 | 115 | 159 | 115 |
| Outside diameter of secondary coating layer(μm) | 156 | 152 | 164 | 193 | 153 |
| Young's modulus of glass portion(GPa) | 74 | 74 | 74 | 74 | 74 |
| Young's modulus of primary coating layer(MPa) | 0.2 | 0.2 | 0.2 | 0.5 | 0.2 |
| Young's modulus of secondary coating layer(MPa) | 1150 | 1400 | 1400 | 1150 | 1400 |
| Thickness of primary coating layer(μm) | 22.5 | 17.5 | 17.5 | 17 | 17.5 |
| Thickness of secondary coating layer(μm) | 15.5 | 18.5 | 24.5 | 17 | 19 |
| Coating thickness(μm) | 38 | 36 | 42 | 34 | 36.5 |
| Bending rigidity of glass portion(MPa · μm$^4$) | $1.49 \times 10^{11}$ | $1.49 \times 10^{11}$ | $1.49 \times 10^{11}$ | $8.87 \times 10^{11}$ | $1.49 \times 10^{11}$ |
| Bending rigidity of secondary coating layer(MPa · μm$^4$) | $1.97 \times 10^{10}$ | $2.47 \times 10^{10}$ | $3.77 \times 10^{10}$ | $4.22 \times 10^{10}$ | $2.56 \times 10^{10}$ |
| μ (a.u.) | 3 | 3 | 3 | 3 | 3 |
| $\kappa_s$(MPa) | 0.71 | 0.91 | 0.91 | 3.68 | 0.91 |
| Deformation resistance of secondary coating layer(MPa) | 9.22 | 20.39 | 37.54 | 6.79 | 21.65 |
| $F_{\mu BL\_G}$(GPa$^{-1}$ · μm$^{-10.5}$ · $10^{-27}$) | 3.66 | 3.90 | 2.38 | 1.92 | 3.72 |
| Mode field diameter(μm) | 8.83 | 8.66 | 8.66 | 8.6 | 8.6 |
| Cable cutoff wavelength(μm) | 1.230 | 1.230 | 1.230 | 1.230 | 1.200 |
| MAC value(a.u.) | 7.18 | 7.04 | 7.04 | 6.99 | 7.17 |
| Macrobend loss(dB/turn) | 0.100 | 0.050 | 0.050 | 0.050 | 0.200 |
| Propagation constant difference (rad/m) | 12498 | 13182 | 13182 | 13066 | 11613 |
| Zero dispersion wavelength(μm) | 1.311 | 1.316 | 1.316 | 1.317 | 1.310 |
| Zero dispersion slope(ps/km/nm$^2$) | 0.088 | 0.086 | 0.086 | 0.086 | 0.087 |
| $F_{\mu BL\_O}$(dB/turn) | 0.72 | 0.35 | 0.35 | 0.35 | 1.43 |
| $F_{\mu BL\_GO}$ ({GPa$^{-1}$ · μm$^{-10.5}$ · dB/turn} · $10^{-27}$) | 2.63 | 1.37 | 0.84 | 0.67 | 5.33 |
| Sandpaper tension winding loss increase(dB/km) | 0.85 | 0.46 | 0.3 | 0.22 | 0.98 |

TABLE 2

| Example | 6 | 7 | 8 | 9 | 10 |
|---|---|---|---|---|---|
| Outside diameter of glass portion(μm) | 80 | 125 | 125 | 80 | 80 |
| Outside diameter of primary coating layer(μm) | 115 | 159 | 190 | 113 | 113 |
| Outside diameter of secondary coating layer(μm) | 153 | 193 | 240 | 164 | 153 |
| Young's modulus of glass portion(GPa) | 74 | 74 | 74 | 114 | 74 |
| Young's modulus of primary coating layer(MPa) | 0.2 | 0.5 | 0.6 | 0.2 | 0.2 |
| Young's modulus of secondary coating layer(MPa) | 1150 | 1150 | 800 | 1150 | 1150 |
| Thickness of primary coating layer(μm) | 17.5 | 17 | 32.5 | 16.5 | 16.5 |
| Thickness of secondary coating layer(μm) | 19 | 17 | 25 | 25.5 | 20 |
| Coating thickness(μm) | 36.5 | 34 | 57.5 | 42 | 36.5 |
| Bending rigidity of glass portion(MPa · μm$^4$) | $1.49 \times 10^{11}$ | $8.87 \times 10^{11}$ | $8.87 \times 10^{11}$ | $2.29 \times 10^{11}$ | $1.49 \times 10^{11}$ |
| Bending rigidity of secondary coating layer(MPa · μm$^4$) | $2.11 \times 10^{10}$ | $4.22 \times 10^{10}$ | $7.91 \times 10^{10}$ | $3.16 \times 10^{10}$ | $2.17 \times 10^{10}$ |

TABLE 2-continued

| Example | 6 | 7 | 8 | 9 | 10 |
|---|---|---|---|---|---|
| $\mu$ (a.u.) | 3 | 3 | 3 | 3 | 3 |
| $\kappa_s$(MPa) | 0.91 | 3.68 | 2.31 | 0.97 | 0.97 |
| Deformation resistance of secondary coating layer(MPa) | 17.82 | 6.79 | 7.83 | 34.78 | 20.75 |
| $F_{\mu BL\_G}$(GPa$^{-1}$ · µm$^{-10.5}$ · 10$^{-27}$) | 4.53 | 1.92 | 0.48 | 1.29 | 4.72 |
| Mode field diameter(µm) | 8.48 | 8.5 | 8.55 | 8.51 | 8.47 |
| Cable cutoff wavelength(µm) | 1.209 | 1.203 | 1.197 | 1.287 | 1.330 |
| MAC value(a.u.) | 7.01 | 7.07 | 7.14 | 6.61 | 6.37 |
| Macrobend loss(dB/turn) | 0.200 | 0.091 | 0.133 | 0.013 | 0.035 |
| Propagation constant difference (rad/m) | 11403 | 11971 | 11623 | 14259 | 14296 |
| Zero dispersion wavelength(µm) | 1.313 | 1.313 | 1.313 | 1.309 | 1.309 |
| Zero dispersion slope(ps/km/nm$^2$) | 0.085 | 0.086 | 0.086 | 0.091 | 0.091 |
| $F_{\mu BL\_O}$(dB/turn) | 1.40 | 0.65 | 0.95 | 0.09 | 0.22 |
| $F_{\mu BL\_GO}$ ({GPa$^{-1}$ · µm$^{-10.5}$ · dB/turn} · 10$^{-27}$) | 6.35 | 1.24 | 0.47 | 0.11 | 1.05 |
| Sandpaper tension winding loss increase(dB/km) | 1.5 | 0.3 | 0.05 | 0.218 | 0.315 |

TABLE 3

| Example | 11 | 12 | 13 | 14 | 15 |
|---|---|---|---|---|---|
| Outside diameter of glass portion (µm) | 80 | 80 | 80 | 80 | 90 |
| Outside diameter of primary coating layer(µm) | 114 | 114 | 115 | 115 | 121 |
| Outside diameter of secondary coating layer(µm) | 153 | 164 | 153 | 153 | 159 |
| Young's modulus of glass portion(GPa) | 74 | 74 | 74 | 74 | 74 |
| Young's modulus of primary coating layer(MPa) | 0.2 | 0.2 | 0.2 | 0.2 | 0.2 |
| Young's modulus of secondary coating layer(MPa) | 1150 | 1150 | 1150 | 1400 | 1150 |
| Thickness of primary coating layer(µm) | 17 | 17 | 17.5 | 17.5 | 15.5 |
| Thickness of secondary coating layer(µm) | 19.5 | 25 | 19 | 19 | 19 |
| Coating thickness(µm) | 36.5 | 42 | 36.5 | 36.5 | 34.5 |
| Bending rigidity of glass portion(MPa · µm$^4$) | $1.49 \times 10^{11}$ | $1.49 \times 10^{11}$ | $1.49 \times 10^{11}$ | $1.49 \times 10^{11}$ | $2.38 \times 10^{11}$ |
| Bending rigidity of secondary coating layer(MPa · µm$^4$) | $2.14 \times 10^{10}$ | $3.13 \times 10^{10}$ | $2.11 \times 10^{10}$ | $2.56 \times 10^{10}$ | $2.40 \times 10^{10}$ |
| $\mu$ (a.u.) | 3 | 3 | 3 | 3 | 3 |
| $\kappa_s$(MPa) | 0.94 | 0.94 | 0.91 | 0.91 | 1.16 |
| Deformation resistance of secondary coating layer(MPa) | 19.25 | 32.79 | 17.82 | 21.65 | 15.90 |
| $F_{\mu BL\_G}$(GPa$^{-1}$ · µm$^{-10.5}$ · 10$^{-27}$) | 4.61 | 2.98 | 4.53 | 3.72 | 2.74 |
| Mode field diameter(µm) | 8.47 | 8.5 | 8.36 | 8.4 | 8.52 |
| Cable cutoff wavelength(µm) | 1.357 | 1.367 | 1.174 | 1.188 | 1.221 |
| MAC value(a.u.) | 6.24 | 6.22 | 7.12 | 7.07 | 6.98 |
| Macrobend loss(dB/turn) | 0.010 | 0.010 | 0.080 | 0.040 | 0.040 |
| Propagation constant difference (rad/m) | 15223 | 15007 | 13198 | 15278 | 14687 |
| Zero dispersion wavelength(µm) | 1.309 | 1.309 | 1.310 | 1.310 | 1.309 |
| Zero dispersion slope(ps/km/nm$^2$) | 0.091 | 0.091 | 0.089 | 0.089 | 0.091 |
| $F_{\mu BL\_O}$(dB/turn) | 0.06 | 0.06 | 0.57 | 0.28 | 0.28 |
| $F_{\mu BL\_GO}$ ({GPa$^{-1}$ · µm$^{-10.5}$ · dB/turn} · 10$^{-27}$) | 0.29 | 0.19 | 2.58 | 1.05 | 0.76 |
| Sandpaper tension winding loss increase(dB/km) | 0.231 | 0.289 | 0.57 | 0.27 | 0.197 |

TABLE 4

| Example | 16 | 17 | 18 | 19 | 20 |
|---|---|---|---|---|---|
| Outside diameter of glass portion (μm) | 90 | 90 | 80 | 80 | 80 |
| Outside diameter of primary coating layer(μm) | 121 | 121 | 115 | 115 | 115 |
| Outside diameter of secondary coating layer(μm) | 159 | 159 | 153 | 164 | 153 |
| Young's modulus of glass portion(GPa) | 74 | 74 | 74 | 74 | 74 |
| Young's modulus of primary coating layer(MPa) | 0.2 | 0.2 | 0.2 | 0.2 | 0.2 |
| Young's modulus of secondary coating layer(MPa) | 1150 | 1150 | 1150 | 1150 | 1150 |
| Thickness of primary coating layer(μm) | 15.5 | 15.5 | 17.5 | 17.5 | 17.5 |
| Thickness of secondary coating layer(μm) | 19 | 19 | 19 | 24.5 | 19 |
| Coating thickness(μm) | 34.5 | 34.5 | 36.5 | 42 | 36.5 |
| Bending rigidity of glass portion(MPa · μm$^4$) | $2.38 \times 10^{11}$ | $2.38 \times 10^{11}$ | $1.49 \times 10^{11}$ | $1.49 \times 10^{11}$ | $1.49 \times 10^{11}$ |
| Bending rigidity of secondary coating layer(MPa · μm$^4$) | $2.40 \times 10^{10}$ | $2.40 \times 10^{10}$ | $2.11 \times 10^{10}$ | $3.10 \times 10^{10}$ | $2.11 \times 10^{10}$ |
| μ (a.u.) | 3 | 3 | 3 | 3 | 3 |
| $\kappa_s$(MPa) | 1.16 | 1.16 | 0.91 | 0.91 | 0.91 |
| Deformation resistance of secondary coating layer(MPa) | 15.90 | 15.90 | 17.82 | 30.87 | 17.82 |
| $F_{\mu BL\_G}$(GPa$^{-1}$ · μm$^{-10.5}$ · $10^{-27}$) | 2.74 | 2.74 | 4.53 | 2.90 | 4.53 |
| Mode field diameter(μm) | 8.506 | 8.46 | 7.645 | 7.64 | 7.607 |
| Cable cutoff wavelength(μm) | 1.270 | 1.286 | 1.184 | 1.245 | 1.271 |
| MAC value(a.u.) | 6.70 | 6.58 | 6.46 | 6.14 | 5.99 |
| Macrobend loss(dB/turn) | 0.017 | 0.008 | 0.070 | 0.006 | 0.004 |
| Propagation constant difference (rad/m) | 14392 | 15187 | 12929 | 13865 | 14825 |
| Zero dispersion wavelength(μm) | 1.309 | 1.309 | 1.336 | 1.336 | 1.336 |
| Zero dispersion slope(ps/km/nm$^2$) | 0.091 | 0.091 | 0.079 | 0.079 | 0.079 |
| $F_{\mu BL\_O}$(dB/turn) | 0.11 | 0.05 | 0.45 | 0.04 | 0.02 |
| $F_{\mu BL\_GO}$ ({GPa$^{-1}$ · μm$^{-10.5}$ · dB/turn} · $10^{-27}$) | 0.31 | 0.14 | 2.05 | 0.11 | 0.11 |
| Sandpaper tension winding loss increase(dB/km) | 0.23 | 0.164 | 0.577 | 0.23 | 0.259 |

TABLE 5

| Example | 21 | 22 |
|---|---|---|
| Outside diameter of glass portion (μm) | 80 | 80 |
| Outside diameter of primary coating layer(μm) | 115 | 115 |
| Outside diameter of secondary coating layer(μm) | 153 | 153 |
| Young's modulus of glass portion(GPa) | 74 | 74 |
| Young's modulus of primary coating layer(MPa) | 0.2 | 0.2 |
| Young's modulus of secondary coating layer(MPa) | 1150 | 1400 |
| Thickness of primary coating layer(μm) | 17.5 | 17.5 |
| Thickness of secondary coating layer(μm) | 19 | 19 |
| Coating thickness(μm) | 36.5 | 36.5 |
| Bending rigidity of glass portion(MPa · μm$^4$) | $1.49 \times 10^{11}$ | $1.49 \times 10^{11}$ |
| Bending rigidity of secondary coating layer(MPa · μm$^4$) | $2.11 \times 10^{10}$ | $2.56 \times 10^{10}$ |
| μ (a.u.) | 3 | 3 |
| $\kappa_s$(MPa) | 0.91 | 0.91 |
| Deformation resistance of secondary coating layer(MPa) | 17.82 | 21.65 |
| $F_{\mu BL\_G}$(GPa$^{-1}$ · μm$^{-10.5}$ · $10^{-27}$) | 4.53 | 3.72 |
| Mode field diameter(μm) | 7.627 | 7.7 |
| Cable cutoff wavelength(μm) | 1.300 | 1.183 |
| MAC value(a.u.) | 5.87 | 6.51 |
| Macrobend loss(dB/turn) | 0.001 | 0.040 |
| Propagation constant difference (rad/m) | 15702 | 13192 |
| Zero dispersion wavelength(μm) | 1.336 | 1.339 |
| Zero dispersion slope(ps/km/nm$^2$) | 0.079 | 0.079 |
| $F_{\mu BL\_O}$(dB/turn) | 0.01 | 0.26 |
| $F_{\mu BL\_GO}$ ({GPa$^{-1}$ · μm$^{-10.5}$ · dB/turn} · $10^{-27}$) | 0.03 | 0.97 |
| Sandpaper tension winding loss increase(dB/km) | 0.165 | 0.334 |

Figure 5:
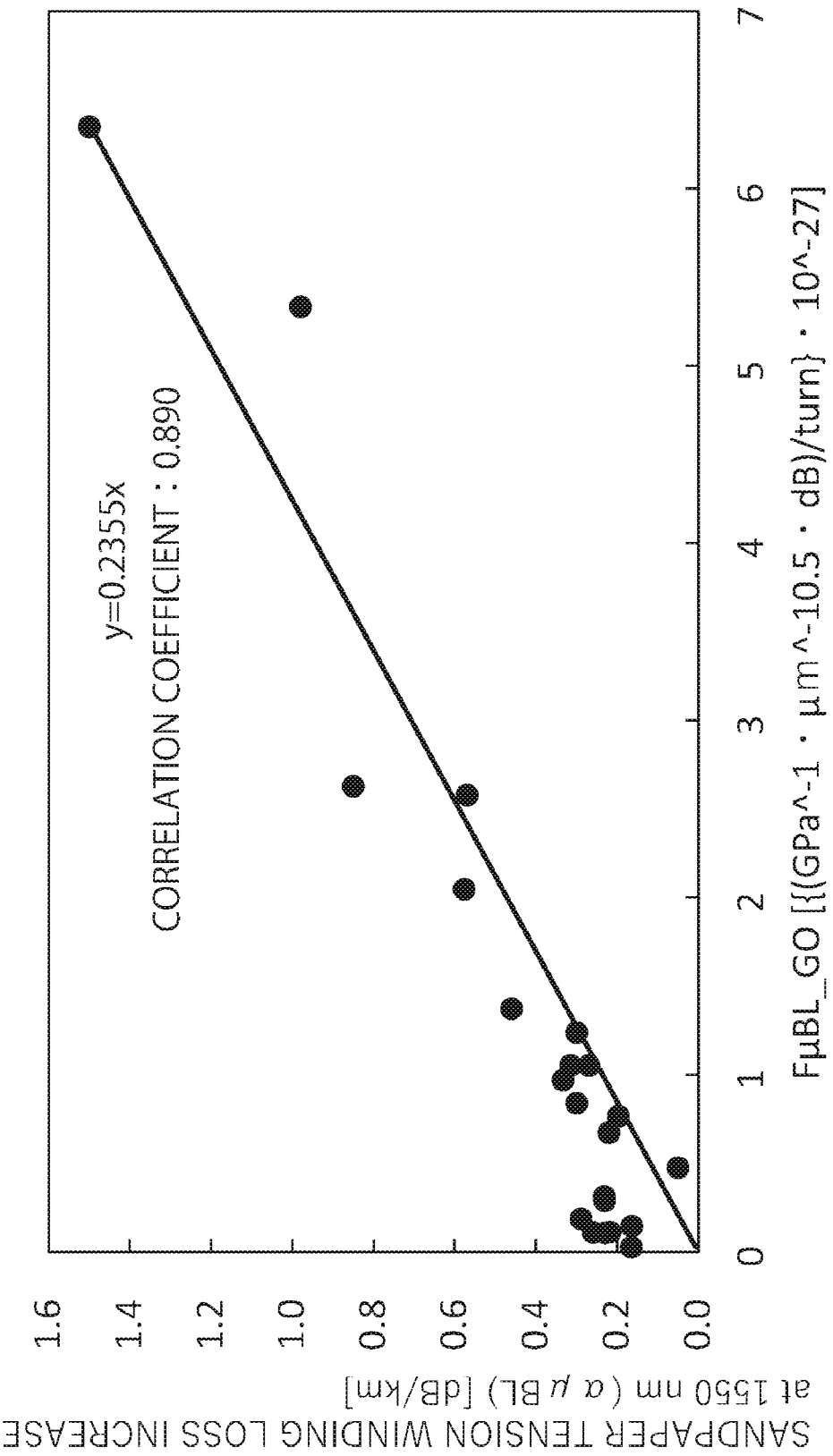
FIG. 5 is a diagram showing a relationship between a value of microbend loss characteristic factor and sandpaper tension winding loss increase in the optical fiber shown in FIG. 3.

The values of the microbend loss characteristic factor $F_{\mu BL\_GO}$ and the values of the sandpaper tension winding loss increase $\alpha_{\mu BL}$ of each of Samples 1 to 22 were plotted with respect to a coordinate system in which the value of microbend loss characteristic factor $F_{\mu BL\_GO}$ is on the horizontal axis (X-axis) and the value of sandpaper tension winding loss increase $\alpha_{\mu BL}$ is on the vertical axis (Y-axis). As a result, the scatter diagram shown in FIG. 5 was obtained. When the function was obtained from this scatter diagram using the least-squares method, a linear function with a positive slope represented by the formula (6) below was obtained. Furthermore, the correlation coefficient of the data in FIG. 5 was 89% or more.

$$Y = 0.2355X \quad (6)$$

That is, it was found that the value of the microbend loss characteristic factor $F_{\mu BL\_GO}$ and the value of the sandpaper tension winding loss increase $\alpha_{\mu BL}$ had a high correlation, and specifically the value of the microbend loss characteristic factor $F_{\mu BL\_GO}$ and the value of the sandpaper tension winding loss increase $\alpha_{\mu BL}$ had a proportional relationship having a generally positive slope.

By the way, as described above, the tape slot type cable (RSCC) has the required characteristics that the value of the sandpaper tension winding loss increase $\alpha_{\mu BL}$ is 0.60 (dm/km) or less. Furthermore, the small-diameter high-density cable (UHDC) has the required characteristics that the value of the sandpaper tension winding loss increase $\alpha_{\mu BL}$ is 0.34 (dm/km) or less. Therefore, Table 6 below indicates the values of the microbend loss characteristic factor $F_{\mu BL\_GO}$, the values of the sandpaper tension winding loss increase $\alpha_{\mu BL}$, the pass/fail of the required characteristics of the tape slot type cable (RSCC), and the pass/fail of the required characteristics of the small-diameter high-density cable (UHDC) of Examples 1 to 22. Note that in Table 6, Y means that the required characteristics are satisfied, and N means that the required characteristics are not satisfied.

to 5 described above so that the value of the microbend loss characteristic factor $F_{\mu BL\_GO}$ is 2.6 ([GPa$^{-1}$·μm$^{-10.5}$·dB/turn]·10$^{-27}$) or less.

Furthermore, it was found that when the value of the microbend loss characteristic factor $F_{\mu BL\_GO}$ is 1.3 ([GPa$^{-1}$·μm$^{-10.5}$·dB/turn]·10$^{-27}$) or less, the value of the sandpaper tension winding loss increase $\alpha_{\mu BL}$ tends to be approximately 0.34 or less and when the value of the microbend loss characteristic factor $F_{\mu BL\_GO}$ is larger than 1.3 ([GPa$^{-1}$·μm$^{-10.5}$·dB/turn]·10$^{-27}$), the value of the sandpaper tension winding loss increase $\alpha_{\mu BL}$ tends to exceed 0.34. In other words, it was found that in addition to the required characteristics of the tape slot type cable, the required characteristics of the small-diameter high-density cable can be satisfied by adjusting the values of the parameters described in Tables 1 to 5 described above so that the value of the microbend loss characteristic factor $F_{\mu BL\_GO}$ is 1.3 ([GPa$^{-1}$·μm$^{-10.5}$·dB/turn]·10$^{-27}$) or less.

Specifically, among Samples 1 to 22, the samples satisfying the required characteristics of the tape slot type cable were the samples excluding Samples 1, 5, and 6. Furthermore, the samples satisfying the required characteristics of the small-diameter high-density cable in addition to the required characteristics of the tape slot type cable were the samples excluding Examples 1, 2, 5, 6, 13, and 18.

Furthermore, among the samples satisfying at least the required characteristics of the tape slot type cable among Samples 1 to 22, it was found that the samples excluding

TABLE 6

| Example | α μBL (dB/km) | $F_{\mu BL\_GO}$ ({GPa$^{-1}$·μm$^{-10.5}$·dB/turn}·10$^{-27}$) | Application to RSCC ($F_{\mu BL\_GO}$ ≤ 2.6) | Application to UHDC ($F_{\mu BL\_GO}$ ≤ 1.3) |
|---|---|---|---|---|
| 21 | 0.17 | 0.03 | Y | Y |
| 19 | 0.23 | 0.11 | Y | Y |
| 20 | 0.26 | 0.11 | Y | Y |
| 9 | 0.22 | 0.11 | Y | Y |
| 17 | 0.16 | 0.14 | Y | Y |
| 12 | 0.29 | 0.19 | Y | Y |
| 11 | 0.23 | 0.29 | Y | Y |
| 16 | 0.23 | 0.31 | Y | Y |
| 8 | 0.05 | 0.46 | Y | Y |
| 4 | 0.22 | 0.67 | Y | Y |
| 15 | 0.20 | 0.76 | Y | Y |
| 3 | 0.30 | 0.84 | Y | Y |
| 22 | 0.33 | 0.97 | Y | Y |
| 10 | 0.32 | 1.05 | Y | Y |
| 14 | 0.27 | 1.05 | Y | Y |
| 7 | 0.30 | 1.24 | Y | Y |
| 2 | 0.46 | 1.37 | Y | N |
| 18 | 0.58 | 2.05 | Y | N |
| 13 | 0.57 | 2.58 | Y | N |
| 1 | 0.85 | 2.63 | N | N |
| 5 | 0.98 | 5.33 | N | N |
| 6 | 1.50 | 6.35 | N | N |

From Table 6, it was found that when the value of the microbend loss characteristic factor $F_{\mu BL\_GO}$ is 2.6 ([GPa$^{-1}$·μm$^{-10.5}$·dB/turn]·10$^{-27}$) or less, the value of the sandpaper tension winding loss increase $\alpha_{\mu BL}$ tends to be approximately 0.60 or less and when the value of the microbend loss characteristic factor $F_{\mu BL\_GO}$ is larger than 2.6 ([GPa$^{-1}$·μm$^{-10.5}$·dB/turn]·10$^{-27}$), the value of the sandpaper tension winding loss increase $\alpha_{\mu BL}$ tends to exceed 0.60. In other words, it was found that the required characteristics of the tape slot type cable can be satisfied by adjusting the values of the parameters described in Tables 1

Samples 4, 7, and 8 have an outside diameter of the glass portion of 80 μm or 90 μm smaller than the outside diameter (125 μm) of the glass portion of the general optical fiber. Specifically, it was found that Samples 2, 3, 9 to 14, and 18 to 22 have an outside diameter of the glass portion of 80 μm, and Samples 15 to 17 have an outside diameter of the glass portion of 90 μm. That is, it was found that, by adjusting the parameters as in Samples 2, 3, and 9 to 22, an optical fiber that satisfies at least the required characteristics of the tape slot type cable and has the outside diameter of the glass portion smaller than that of the general optical fiber can be formed.

Furthermore, it was found that the samples, excluding Sample 8, satisfying at least the required characteristics of the tape slot type cable among Samples 1 to 22 have a coating thickness smaller than the coating thickness (approximately 57.5 μm) of the general optical fiber. Specifically, it was found that Samples 3, 9, and 12 have a coating thickness of 42.0 μm, Samples 10, 11, 13, 14, 18, and 20 to 22 have a coating thickness of 36.5 μm, Sample 2 has a coating thickness of 36.0 μm, Samples 15 to 17 have a coating thickness of 34.5 μm, and Samples 4 and 7 have a coating thickness of 34.0 μm. That is, it was found that, by adjusting the parameters as in Samples 2 to 4, 7, and 9 to 22, an optical fiber that satisfies at least the required characteristics of the tape slot type cable and has the coating thickness smaller than that of the general optical fiber can be formed.

As described above, it was found that, among Samples 1 to 22, the samples excluding Samples 1, 5, 6, and 8 satisfy at least the required characteristics of the tape slot type cable and have the outside diameter of the glass portion and the coating thickness smaller than those of the general optical fiber. By forming both the outside diameter of the glass portion and the coating thickness to be smaller than the outside diameter of the glass portion and the coating thickness of the general optical fiber, it is possible to effectively realize a reduction in diameter of the optical fiber.

Furthermore, the optical fibers of Samples 1 to 22 have an MFD of 7.6 μm or more. When the MFD is too small, an MFD mismatch can occur when connection to a general-purpose optical fiber is established. However, when the MFD of the optical fiber is 7.6 μm or more, the MFD mismatch when connection to a general-purpose optical fiber is established can be small. Therefore, the occurrence of connection loss can be effectively suppressed.

Moreover, the optical fibers of Samples 5 to 8 meet the international standard ITU-.G.657.A1. That is, the MFD at a wavelength of 1310 nm is 8.2 μm or more and 9.6 μm or less, the cable cutoff wavelength is 1260 nm or less, the zero dispersion wavelength is 1300 to 1324 nm, the zero dispersion slope is 0.073 ps/km/nm or more and 0.092 ps/km/nm or less, and the macrobend loss at a wavelength of 1625 nm by bending at a radius of 10 mm is 1.5 dB/turn or less. Furthermore, the optical fibers of Samples 1 to 4 satisfy ITU-T.G.657.A2. That is, the MFD at a wavelength of 1310 nm is 8.2 μm or more and 9.6 μm or less, the cable cutoff wavelength is 1260 nm or less, the zero dispersion wavelength is 1300 nm or more and 1324 nm or less, the zero dispersion slope is 0.073 ps/km/nm or more and 0.092 ps/km/nm or less, and the macrobend loss at a wavelength of 1625 nm by bending at a radius of 10 mm is 0.2 dB/turn or less. Furthermore, the optical fibers of Samples 13 to 15 satisfy ITU-T.G.657.B3. That is, the MFD at a wavelength of 1310 nm is 8.2 μm or more and 9.6 μm or less, the cable cutoff wavelength is 1260 nm or less, the zero dispersion wavelength is 1300 nm or more and 1324 nm or less, the zero dispersion slope is 0.073 ps/km/nm or more and 0.092 ps/km/nm or less, and the macrobend loss at a wavelength of 1625 nm by bending at a radius of 10 mm is 0.1 dB/turn or less.

Examples 23 to 28

Furthermore, the values of the microbend loss characteristic factor $F_{\mu BL\_GO}$ of Samples 23 to 28 of optical fiber were determined and adjusted as indicated in Table 7 below on the assumption of an optical fiber having the same optical characteristics as Samples 16, 17, and 19, specifically, the same MFD, cable cutoff wavelength, MAC value, macrobend loss (bending loss), propagation constant difference, zero dispersion wavelength, and zero dispersion slope as those samples, the same thickness of the primary coating layer and thickness of the secondary coating layer as those of Sample 19, and an outside diameter of the glass portion of 65 μm.

TABLE 7

| Example | 23 | 24 | 25 | 26 | 27 | 28 |
|---|---|---|---|---|---|---|
| Outside diameter of glass portion (μm) | 65 | 65 | 65 | 65 | 65 | 65 |
| Outside diameter of primary coating layer(μm) | 100 | 100 | 100 | 100 | 100 | 100 |
| Outside diameter of secondary coating layer(μm) | 149 | 149 | 149 | 149 | 149 | 149 |
| Young's modulus of glass portion(GPa) | 74 | 74 | 74 | 74 | 74 | 74 |
| Young's modulus of primary coating layer(MPa) | 0.2 | 0.2 | 0.2 | 0.2 | 0.2 | 0.2 |
| Young's modulus of secondary coating layer(MPa) | 1400 | 1150 | 1400 | 1150 | 1400 | 1150 |
| Thickness of primary coating layer(μm) | 17.5 | 17.5 | 17.5 | 17.5 | 17.5 | 17.5 |
| Thickness of secondary coating layer(μm) | 24.5 | 24.5 | 24.5 | 24.5 | 24.5 | 24.5 |
| Coating thickness(μm) | 42 | 42 | 42 | 42 | 42 | 42 |
| Bending rigidity of glass portion(MPa · μm⁴) | $6.48 \times 10^{10}$ | $6.48 \times 10^{10}$ | $6.48 \times 10^{10}$ | $6.48 \times 10^{10}$ | $6.48 \times 10^{10}$ | $6.48 \times 10^{10}$ |
| Bending rigidity of secondary coating layer(MPa · μm⁴) | $2.70 \times 10^{10}$ | $2.22 \times 10^{10}$ | $2.70 \times 10^{10}$ | $2.22 \times 10^{10}$ | $2.70 \times 10^{10}$ | $2.22 \times 10^{10}$ |
| μ (a.u.) | 3 | 3 | 3 | 3 | 3 | 3 |
| $\kappa_s$(MPa) | 0.74 | 0.74 | 0.74 | 0.74 | 0.74 | 0.74 |
| Deformation resistance of secondary coating layer(MPa) | 49.99 | 41.10 | 49.99 | 41.10 | 49.99 | 41.10 |
| $F_{\mu BL\_G}$(GPa⁻¹ · μm⁻¹⁰·⁵ · 10⁻²⁷) | 9.15 | 11.14 | 9.15 | 11.14 | 9.15 | 11.14 |
| Mode field diameter(μm) | 7.64 | 7.64 | 8.506 | 8.506 | 8.46 | 8.46 |
| Cable cutoff wavelength(μm) | 1.245 | 1.245 | 1.270 | 1.270 | 1.286 | 1.286 |
| MAC value(a.u.) | 6.14 | 6.14 | 6.70 | 6.70 | 6.58 | 6.58 |

TABLE 7-continued

| Example | 23 | 24 | 25 | 26 | 27 | 28 |
|---|---|---|---|---|---|---|
| Macrobend loss(dB/turn) | 0.006 | 0.006 | 0.017 | 0.017 | 0.008 | 0.008 |
| Propagation constant difference (rad/m) | 13865 | 13865 | 14392 | 14392 | 15187 | 15187 |
| Zero dispersion wavelength(μm) | 1.336 | 1.336 | 1.309 | 1.309 | 1.309 | 1.309 |
| Zero dispersion slope(ps/km/nm$^2$) | 0.079 | 0.079 | 0.091 | 0.091 | 0.091 | 0.091 |
| $F_{\mu BL\_O}$(dB/turn) | 0.04 | 0.04 | 0.11 | 0.11 | 0.05 | 0.05 |
| $F_{\mu BL\_GO}$ ({GPa$^{-1}$ · μm$^{-10.5}$ · dB/turn} · 10$^{-27}$) | 0.34 | 0.41 | 1.04 | 1.27 | 0.48 | 0.59 |
| Application to RSCC | Y | Y | Y | Y | Y | Y |
| Application to UHDC | Y | Y | Y | Y | Y | Y |

As indicated in Table 7, each of Samples 23 to 28 has an outside diameter of the glass portion of 65 μm and a coating thickness of 42 μm. Furthermore, it was found that the values of the microbend loss characteristic factor $F_{\mu BL\_GO}$ of Samples 23 to 28 are all 2.6 ([GPa$^{-1}$·μm$^{-10.5}$·dB/turn]·$10^{-27}$) or less, and Samples 23 to 28 satisfy the required characteristics of the tape slot type cable. Furthermore, it was found that the values of the microbend loss characteristic factor $F_{\mu BL\_GO}$ of Samples 23 to 28 are all 1.3 ([GPa$^{-1}$·μm$^{-10.5}$·dB/turn]·$10^{-27}$) or less, and Samples 23 to 28 satisfy the required characteristics of the small-diameter high-density cable in addition to the required characteristics of the tape slot type cable.

Examples 29 to 36

Furthermore, the values of the microbend loss characteristic factor $F_{\mu BL\_GO}$ of Samples 29 to 36 of optical fiber were determined and adjusted as indicated in Tables 8 and 9 below on the assumption of an optical fiber having the same optical characteristics as Samples 15, 16, 17, and 19, specifically, the same MFD, cable cutoff wavelength, MAC value, macrobend loss, propagation constant difference, zero dispersion wavelength, and zero dispersion slope as those samples, the same thickness of the primary coating layer and thickness of the secondary coating layer as those of Example 19, and an outside diameter of the glass portion of 70 μm.

TABLE 8

| Example | 29 | 30 | 31 | 32 |
|---|---|---|---|---|
| Outside diameter of glass portion (μm) | 70 | 70 | 70 | 70 |
| Outside diameter of primary coating layer(μm) | 105 | 105 | 105 | 105 |
| Outside diameter of secondary coating layer(μm) | 154 | 154 | 154 | 154 |
| Young's modulus of glass portion(GPa) | 74 | 74 | 74 | 74 |
| Young's modulus of primary coating layer(MPa) | 0.2 | 0.2 | 0.15 | 0.15 |
| Young's modulus of secondary coating layer(MPa) | 1400 | 1150 | 1400 | 1150 |
| Thickness of primary coating layer(μm) | 17.5 | 17.5 | 17.5 | 17.5 |
| Thickness of secondary coating layer(μm) | 24.5 | 24.5 | 24.5 | 24.5 |
| Coating thickness(μm) | 42 | 42 | 42 | 42 |
| Bending rigidity of glass portion(MPa · μm$^4$) | $8.72 \times 10^{10}$ | $8.72 \times 10^{10}$ | $8.72 \times 10^{10}$ | $8.72 \times 10^{10}$ |
| Bending rigidity of secondary coating layer(MPa · μm$^4$) | $3.03 \times 10^{10}$ | $2.49 \times 10^{10}$ | $3.03 \times 10^{10}$ | $2.49 \times 10^{10}$ |
| μ (a.u.) | 3 | 3 | 3 | 3 |
| $\kappa_s$(MPa) | 0.80 | 0.80 | 0.60 | 0.60 |
| Deformation resistance of secondary coating layer(MPa) | 45.30 | 37.24 | 45.25 | 37.19 |
| $F_{\mu BL\_G}$(GPa$^{-1}$ · μm$^{-10.5}$ · $10^{-27}$) | 5.66 | 6.89 | 3.19 | 3.88 |
| Mode field diameter(μm) | 7.64 | 7.64 | 8.52 | 8.52 |
| Cable cutoff wavelength(μm) | 1.245 | 1.245 | 1.221 | 1.221 |
| MAC value(a.u.) | 6.14 | 6.14 | 6.98 | 6.98 |
| Macrobend loss(dB/turn) | 0.006 | 0.006 | 0.040 | 0.040 |
| Propagation constant difference (rad/m) | 13865 | 13865 | 14687 | 14687 |
| Zero dispersion wavelength(μm) | 1.336 | 1.336 | 1.309 | 1.309 |
| Zero dispersion slope(ps/km/nm$^2$) | 0.079 | 0.079 | 0.091 | 0.091 |
| $F_{\mu BL\_O}$(dB/turn) | 0.04 | 0.04 | 0.28 | 0.28 |
| $F_{\mu BL\_GO}$ ({GPa$^{-1}$ · μm$^{-10.5}$ · dB/turn} · $10^{-27}$) | 0.21 | 0.25 | 0.89 | 1.08 |

TABLE 8-continued

| Example | 29 | 30 | 31 | 32 |
|---|---|---|---|---|
| Application to RSCC | Y | Y | Y | Y |
| Application to UHDC | Y | Y | Y | Y |

TABLE 9

| Example | 33 | 34 | 35 | 36 |
|---|---|---|---|---|
| Outside diameter of glass portion (μm) | 70 | 70 | 70 | 70 |
| Outside diameter of primary coating layer(μm) | 105 | 105 | 105 | 105 |
| Outside diameter of secondary coating layer(μm) | 154 | 154 | 154 | 154 |
| Young's modulus of glass portion(GPa) | 74 | 74 | 74 | 74 |
| Young's modulus of primary coating layer(MPa) | 0.2 | 0.2 | 0.2 | 0.2 |
| Young's modulus of secondary coating layer(MPa) | 1400 | 1150 | 1400 | 1150 |
| Thickness of primary coating layer(μm) | 17.5 | 17.5 | 17.5 | 17.5 |
| Thickness of secondary coating layer(μm) | 24.5 | 24.5 | 24.5 | 24.5 |
| Coating thickness(μm) | 42 | 42 | 42 | 42 |
| Bending rigidity of glass portion(MPa · μm$^4$) | $8.72 \times 10^{10}$ | $8.72 \times 10^{10}$ | $8.72 \times 10^{10}$ | $8.72 \times 10^{10}$ |
| Bending rigidity of secondary coating layer(MPa · μm$^4$) | $3.03 \times 10^{10}$ | $2.49 \times 10^{10}$ | $3.03 \times 10^{10}$ | $2.49 \times 10^{10}$ |
| μ (a.u.) | 3 | 3 | 3 | 3 |
| $\kappa_s$(MPa) | 0.80 | 0.80 | 0.80 | 0.80 |
| Deformation resistance of secondary coating layer(MPa) | 45.30 | 37.24 | 45.30 | 37.24 |
| $F_{\mu BL\_G}$(GPa$^{-1}$ · μm$^{-10.5}$ · $10^{-27}$) | 5.66 | 6.89 | 5.66 | 6.89 |
| Mode field diameter(μm) | 8.506 | 8.506 | 8.46 | 8.46 |
| Cable cutoff wavelength(μm) | 1.270 | 1.270 | 1.286 | 1.286 |
| MAC value(a.u.) | 6.70 | 6.70 | 6.58 | 6.58 |
| Macrobend loss(dB/turn) | 0.017 | 0.017 | 0.008 | 0.008 |
| Propagation constant difference (rad/m) | 14392 | 14392 | 15187 | 15187 |
| Zero dispersion wavelength(μm) | 1.309 | 1.309 | 1.309 | 1.309 |
| Zero dispersion slope(ps/km/nm$^2$) | 0.091 | 0.091 | 0.091 | 0.091 |
| $F_{\mu BL\_O}$(dB/turn) | 0.11 | 0.11 | 0.05 | 0.05 |
| $F_{\mu BL\_GO}$ ({GPa$^{-1}$ · μm$^{-10.5}$ · dB/turn} · $10^{-27}$) | 0.64 | 0.78 | 0.30 | 0.36 |
| Application to RSCC | Y | Y | Y | Y |
| Application to UHDC | Y | Y | Y | Y |

As indicated in Tables 8 and 9, each of Samples 29 to 36 has an outside diameter of the glass portion of 70 μm and a coating thickness of 42 μm. Furthermore, it was found that the values of the microbend loss characteristic factor $F_{\mu BL\_GO}$ of Samples 29 to 36 are all 2.6 ([GPa$^{-1}$·μm$^{-10.5}$·dB/turn]·$10^{-27}$) or less, and Samples 29 to 36 satisfy the required characteristics of the tape slot type cable. Furthermore, it was found that the values of the microbend loss characteristic factor $F_{\mu BL\_GO}$ of Samples 29 to 36 are all 1.3 ([GPa$^{-1}$·μm$^{-10.5}$·dB/turn]·$10^{-27}$) or less, and Samples 29 to satisfy the required characteristics of the small-diameter high-density cable in addition to the required characteristics of the tape slot type cable.

Examples 37 to 42

Furthermore, the values of the microbend loss characteristic factor $F_{\mu BL\_GO}$ of Samples 37 to 42 of optical fiber were determined and adjusted as indicated in Table 10 below on the assumption of an optical fiber having the same optical characteristics as Samples 15, 17, and 19, specifically, the same MFD, cable cutoff wavelength, MAC value, macrobend loss, propagation constant difference, zero dispersion wavelength, and zero dispersion slope as those samples, the same thickness of the primary coating layer and thickness of the secondary coating layer as those of Example 19, and an outside diameter of the glass portion of 75 μm.

TABLE 10

| Example | 37 | 38 | 39 | 40 | 41 | 42 |
|---|---|---|---|---|---|---|
| Outside diameter of glass portion (μm) | 75 | 75 | 75 | 75 | 75 | 75 |
| Outside diameter of primary coating layer(μm) | 110 | 110 | 110 | 110 | 110 | 110 |
| Outside diameter of secondary coating layer(μm) | 159 | 159 | 159 | 159 | 159 | 159 |
| Young's modulus of glass portion(GPa) | 74 | 74 | 74 | 74 | 74 | 74 |
| Young's modulus of primary coating layer(MPa) | 0.2 | 0.2 | 0.2 | 0.2 | 0.2 | 0.2 |
| Young's modulus of secondary coating layer(MPa) | 1400 | 1150 | 1400 | 1150 | 1400 | 1150 |
| Thickness of primary coating layer(μm) | 17.5 | 17.5 | 17.5 | 17.5 | 17.5 | 17.5 |
| Thickness of secondary coating layer(μm) | 24.5 | 24.5 | 24.5 | 24.5 | 24.5 | 24.5 |
| Coating thickness(μm) | 42 | 42 | 42 | 42 | 42 | 42 |
| Bending rigidity of glass portion(MPa · μm$^4$) | $1.15 \times 10^{11}$ | $1.15 \times 10^{11}$ | $1.15 \times 10^{11}$ | $1.15 \times 10^{11}$ | $1.15 \times 10^{11}$ | $1.15 \times 10^{11}$ |
| Bending rigidity of secondary coating layer(MPa · μm$^4$) | $3.39 \times 10^{10}$ | $2.78 \times 10^{10}$ | $3.39 \times 10^{10}$ | $2.78 \times 10^{10}$ | $3.39 \times 10^{10}$ | $2.78 \times 10^{10}$ |
| μ (a.u.) | 3 | 3 | 3 | 3 | 3 | 3 |
| $\kappa_s$(MPa) | 0.86 | 0.86 | 0.86 | 0.86 | 0.86 | 0.86 |
| Deformation resistance of secondary coating layer(MPa) | 41.18 | 33.86 | 41.18 | 33.86 | 41.18 | 33.86 |
| $F_{\mu BL\_G}$(GPa$^{-1}$ · μm$^{-10.5}$ · $10^{-27}$) | 3.62 | 4.40 | 3.62 | 4.40 | 3.62 | 4.40 |
| Mode field diameter(μm) | 7.64 | 7.64 | 8.52 | 8.52 | 8.46 | 8.46 |
| Cable cutoff wavelength(μm) | 1.245 | 1.245 | 1.221 | 1.221 | 1.286 | 1.286 |
| MAC value(a.u.) | 6.14 | 6.14 | 6.98 | 6.98 | 6.58 | 6.58 |
| Macrobend loss(dB/turn) | 0.006 | 0.006 | 0.040 | 0.040 | 0.008 | 0.008 |
| Propagation constant difference (rad/m) | 13865 | 13865 | 14687 | 14687 | 15187 | 15187 |
| Zero dispersion wavelength(μm) | 1.336 | 1.336 | 1.309 | 1.309 | 1.309 | 1.309 |
| Zero dispersion slope(ps/km/nm$^2$) | 0.079 | 0.079 | 0.091 | 0.091 | 0.091 | 0.091 |
| $F_{\mu BL\_O}$(dB/turn) | 0.04 | 0.04 | 0.28 | 0.28 | 0.05 | 0.05 |
| $F_{\mu BL\_GO}$ ({GPa$^{-1}$ · μm$^{-10.5}$ · dB/turn} · $10^{-27}$) | 0.13 | 0.16 | 1.01 | 1.23 | 0.19 | 0.23 |
| Application to RSCC | Y | Y | Y | Y | Y | Y |
| Application to UHDC | Y | Y | Y | Y | Y | Y |

As indicated in Table 10, each of Samples 37 to 42 has an outside diameter of the glass portion of 75 μm and a coating thickness of 42 μm. Furthermore, it was found that the values of the microbend loss characteristic factor $F_{\mu BL\_GO}$ of Samples 37 to 42 are all 2.6 ([GPa$^{-1}$·μm$^{-10.5}$·dB/turn]·$10^{-27}$) or less, and Samples 37 to 42 satisfy the required characteristics of the tape slot type cable. Furthermore, it was found that the values of the microbend loss characteristic factor $F_{\mu BL\_GO}$ of Samples 37 to 42 are all 1.3 ([GPa$^{-1}$·μm$^{-10.5}$·dB/turn]·$10^{-27}$) or less, and Samples 37 to 42 satisfy the required characteristics of the small-diameter high-density cable in addition to the required characteristics of the tape slot type cable.

Examples 43 to 48

Furthermore, the values of the microbend loss characteristic factor $F_{\mu BL\_GO}$ of Samples 43 to 48 of optical fiber were determined and adjusted as indicated in Table 11 below on the assumption of an optical fiber having the same optical characteristics as Samples 15, 17, and 19, specifically, the same MFD, cable cutoff wavelength, MAC value, macrobend loss, propagation constant difference, zero dispersion wavelength, and zero dispersion slope as those samples, an outside diameter of the secondary coating layer of 125 μm, and an outside diameter of the glass portion of 80 μm.

TABLE 11

| Example | 43 | 44 | 45 | 46 | 47 | 48 |
|---|---|---|---|---|---|---|
| Outside diameter of glass portion (μm) | 80 | 80 | 80 | 80 | 80 | 80 |
| Outside diameter of primary coating layer(μm) | 100 | 100 | 100 | 100 | 100 | 100 |
| Outside diameter of secondary coating layer(μm) | 125 | 125 | 125 | 125 | 125 | 125 |
| Young's modulus of glass portion(GPa) | 74 | 74 | 74 | 74 | 74 | 74 |
| Young's modulus of primary coating layer(MPa) | 0.15 | 0.15 | 0.15 | 0.15 | 0.15 | 0.15 |

TABLE 11-continued

| Example | 43 | 44 | 45 | 46 | 47 | 48 |
|---|---|---|---|---|---|---|
| Young's modulus of secondary coating layer(MPa) | 1400 | 1150 | 1400 | 1150 | 1400 | 1150 |
| Thickness of primary coating layer(μm) | 10 | 10 | 10 | 10 | 10 | 10 |
| Thickness of secondary coating layer(μm) | 12.5 | 12.5 | 12.5 | 12.5 | 12.5 | 12.5 |
| Coating thickness(μm) | 22.5 | 22.5 | 22.5 | 22.5 | 22.5 | 22.5 |
| Bending rigidity of glass portion(MPa · μm$^4$) | $1.49 \times 10^{11}$ | $1.49 \times 10^{11}$ | $1.49 \times 10^{11}$ | $1.49 \times 10^{11}$ | $1.49 \times 10^{11}$ | $1.49 \times 10^{11}$ |
| Bending rigidity of secondary coating layer(MPa · μm$^4$) | $9.91 \times 10^9$ | $8.14 \times 10^9$ | $9.91 \times 10^9$ | $8.14 \times 10^9$ | $9.91 \times 10^9$ | $8.14 \times 10^9$ |
| μ (a.u.) | 3 | 3 | 3 | 3 | 3 | 3 |
| $\kappa_s$(MPa) | 1.20 | 1.20 | 1.20 | 1.20 | 1.20 | 1.20 |
| Deformation resistance of secondary coating layer(MPa) | 11.35 | 9.35 | 11.35 | 9.35 | 11.35 | 9.35 |
| $F_{\mu BL\_G}$(GPa$^{-1}$ · μm$^{-10.5}$ · $10^{-27}$) | 14.80 | 17.99 | 14.80 | 17.99 | 14.80 | 17.99 |
| Mode field diameter(μm) | 7.64 | 7.64 | 8.52 | 8.52 | 8.46 | 8.46 |
| Cable cutoff wavelength(μm) | 1.245 | 1.245 | 1.221 | 1.221 | 1.286 | 1.286 |
| MAC value(a.u.) | 6.14 | 6.14 | 6.98 | 6.98 | 6.58 | 6.58 |
| Macrobend loss(dB/turn) | 0.006 | 0.006 | 0.040 | 0.040 | 0.008 | 0.008 |
| Propagation constant difference(rad/m) | 13865 | 13865 | 14687 | 14687 | 15187 | 15187 |
| Zero dispersion wavelength(μm) | 1.336 | 1.336 | 1.309 | 1.309 | 1.309 | 1.309 |
| Zero dispersion slope(ps/km/nm$^2$) | 0.079 | 0.079 | 0.091 | 0.091 | 0.091 | 0.091 |
| $F_{\mu BL\_O}$(dB/turn) | 0.04 | 0.04 | 0.28 | 0.28 | 0.05 | 0.05 |
| $F_{\mu BL\_GO}$ ({GPa$^{-1}$ · μm$^{-10.5}$ · dB/turn} · $10^{-27}$) | 0.54 | 0.66 | 4.13 | 5.02 | 0.78 | 0.95 |
| Application to RSCC | Y | Y | N | N | Y | Y |
| Application to UHDC | Y | Y | N | N | Y | Y |

As indicated in Table 11, each of Samples 43 to 48 has an outside diameter of the glass portion of 80 μm, an outside diameter of the secondary coating layer of 125 μm, and a thickness of the coating layer of 22.5 μm. Furthermore, it was found that the values of the microbend loss characteristic factor $F_{\mu BL\_GO}$ of Samples 43, 44, 47, and 48 are all 1.3 ([GPa$^{-1}$·μm$^{-10.5}$·dB/turn]·$10^{-27}$) or less, and Samples 43, 44, 47, and 48 satisfy the required characteristics of the small-diameter high-density cable in addition to the required characteristics of the tape slot type cable. Note that similar to Samples 43, 44, 47 and 48, Samples 45 and 46 have an outside diameter of the glass portion of 80 μm, an outside diameter of the secondary coating layer of 125 μm, and a thickness of the coating layer of 22.5 μm, but the values of the microbend loss characteristic factor $F_{\mu BL\_GO}$ exceed 2.6 ([GPa$^{-1}$·μm$^{-10.5}$·dB/turn]·$10^{-27}$), and do not satisfy the required characteristics of the tape slot type cable or the required characteristics of the small-diameter high-density cable.

Although the present invention has been described above by taking the aforementioned embodiments as an example, the present invention is not limited thereto.

For example, in the first and second embodiments described above, the example in which the secondary coating layer is the outermost layer of the optical fiber has been described. However, even when a colored layer is further provided as a third coating layer on the outer periphery of the secondary coating layer, the secondary coating layer and the colored layer can be applied to one or more embodiments of the invention as a second coating layer, i.e., the secondary coating layer as long as the Young's modulus of the colored layer is not significantly different from the Young's modulus of the secondary coating layer.

According to one or more embodiments of the invention, an optical fiber capable of suppressing microbend loss is provided, and can be used in a field such as a communication infrastructure.

The invention claimed is:

1. An optical fiber comprising
  a glass portion comprising a core and a clad surrounding the core;
  a primary coating layer covering the clad; and
  a secondary coating layer covering the primary coating layer,
  wherein a value of microbend loss characteristic factor $F_{\mu BL\_GO}$ ([GPa$^{-1}$·μm$^{-10.5}$·dB/turn]·$10^{-27}$) is 2.6 ([GPa$^{-1}$·μm$^{-10.5}$·dB/turn]·$10^{-27}$) or less when represented by $$F_{\mu BL\_GO} = F_{\mu BL\_G} \times F_{\mu BL\_O},$$

wherein geometry microbend loss characteristic $F_{\mu BL\_G}$ (GPa$^{-1}$·μm$^{-10.5}$·$10^{-27}$) of the optical fiber is represented by $$F_{\mu BL\_G} = \frac{K_s^2}{H_f^2 \times D_0^{0.375} \times H_0^{0.625}}$$

$$K_s = \frac{E_p d_f}{t_p},\ H_f = \frac{\pi}{4} E_g \left(\frac{d_f}{2}\right)^4,\ D_0 = E_p + \left(\frac{t_s}{R_s}\right)^3 E_s,\ H_0 = \frac{\pi}{4} E_s (R_s^4 - R_p^4),$$

where
    $\kappa s$ (MPa) is a spring coefficient of the primary coating layer,
    $H_f$(MPa·μm$^4$) is a bending rigidity of the glass portion,
    $D_0$ (MPa) is a deformation resistance of the secondary coating layer, $H_0$ (MPa·μm⁴) is a bending rigidity of the secondary coating layer,
$E_g$ (GPa) is a Young's modulus of the glass portion,
$E_p$ (MPa) is a Young's modulus of the primary coating layer,
$E_s$ (MPa) is a Young's modulus of the secondary coating layer,
$d_f$ (μm) is an outside diameter of the glass portion,
$R_p$ (μm) is a radius of an outer peripheral surface of the primary coating layer,
$R_s$ (μm) is a radius of an outer peripheral surface of the secondary coating layer,
$t_p$ (μm) is a thickness of the primary coating layer, and
$t_s$ (μm) is a thickness of the secondary coating layer, and
wherein optical microbend loss characteristic $F_{\mu BL\_O}$ (dB/turn) of the optical fiber is represented by $$F_{\mu BL\_O} = \frac{2w}{\lambda_{cc}} \times \alpha_{BL},$$

where
- $2w$ (μm) is a mode field diameter of light having a wavelength of 1310 nm propagating through the optical fiber,
- $\lambda_{cc}$ (μm) is a cable cutoff wavelength of the optical fiber, and
- $\alpha_{BL}$ (dB/turn) is a macrobend loss of the optical fiber at a wavelength of 1625 nm and a radius of 10 mm.

2. The optical fiber according to claim 1, wherein the value of the microbend loss characteristic factor is 1.3 ([GPa⁻¹·μm⁻¹⁰·⁵·dB/turn]·10⁻²⁷) or less.

3. The optical fiber according to claim 1, wherein a coating thickness of a sum of the thickness of the primary coating layer and the thickness of the secondary coating layer is 42.0 μm or less.

4. The optical fiber according to claim 3, wherein the coating thickness is 38.0 μm or less.

5. The optical fiber according to claim 3, wherein the coating thickness is 36.5 μm or less.

6. The optical fiber according to claim 3, wherein the coating thickness is 34.5 μm or less.

7. The optical fiber according to claim 3, wherein the coating thickness is 34.0 μm or less.

8. The optical fiber according to claim 3, wherein the outside diameter of the glass portion is 65 μm or more and 100 μm or less.

9. The optical fiber according to claim 8, wherein the outside diameter of the glass portion is 90 μm or less.

10. The optical fiber according to claim 8, wherein the outside diameter of the glass portion is 80 μm or less.

11. The optical fiber according to claim 8, wherein the outside diameter of the glass portion is 75 μm or less.

12. The optical fiber according to claim 8, wherein the outside diameter of the glass portion is 70 μm or less.

13. The optical fiber according to claim 3, wherein the mode field diameter of light having a wavelength of 1310 nm is 7.6 μm or more and 8.7 μm or less, the cable cutoff wavelength is 1260 nm or less, zero dispersion wavelength is 1300 nm or more and 1324 nm or less, and zero dispersion slope is 0.073 ps/km/nm or more and 0.092 ps/km/nm or less.

14. The optical fiber according to claim 13, wherein the macrobend loss of light having a wavelength of 1625 nm by bending at a radius of 10 mm is 1.5 dB/turn or less.

15. The optical fiber according to claim 13, wherein the macrobend loss of light having a wavelength of 1625 nm by bending at a radius of 10 mm is 0.2 dB/turn or less.

16. The optical fiber according to claim 13, wherein the macrobend loss of light having a wavelength of 1625 nm by bending at a radius of 10 mm is 0.1 dB/turn or less.

\* \* \* \* \*